United States Patent
Ohata et al.

(10) Patent No.: US 6,660,188 B1
(45) Date of Patent: Dec. 9, 2003

(54) ELECTRICAL CONDUCTING POLYMER, SOLID ELECTROLYTIC CAPACITOR AND MANUFACTURING METHOD THEREOF

(75) Inventors: Hideki Ohata, Chiba (JP); Koro Shirane, Chiba (JP); Ryuji Monden, Nagano (JP); Atsushi Sakai, Nagano (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 09/518,641

(22) Filed: Mar. 3, 2000

Related U.S. Application Data

(63) Continuation-in-part of application No. 09/391,160, filed on Sep. 8, 1999.
(60) Provisional application No. 60/129,044, filed on Apr. 13, 1999, and provisional application No. 60/129,045, filed on Apr. 13, 1999.

(51) Int. Cl.[7] ................................................. H01B 1/00
(52) U.S. Cl. ................... 252/500; 252/511; 528/310; 528/373; 528/422; 528/423; 528/424; 528/425
(58) Field of Search ................... 252/511, 500; 528/310, 373, 422, 423, 424, 425

(56) References Cited

U.S. PATENT DOCUMENTS

| | | | |
|---|---|---|---|
| 4,780,796 A | 10/1988 | Fukuda et al. | 361/525 |
| 4,803,596 A | 2/1989 | Hellwig et al. | 361/525 |
| 4,910,645 A | 3/1990 | Jonas et al. | 361/525 |
| 4,959,753 A | 9/1990 | Kudoh et al. | 361/525 |
| 5,422,423 A * | 6/1995 | Shacklette et al. | 528/422 |
| 5,455,736 A | 10/1995 | Nishyama et al. | 361/525 |
| 5,473,503 A | 12/1995 | Sakata et al. | 361/525 |
| 5,567,355 A * | 10/1996 | Wessling et al. | 252/500 |

FOREIGN PATENT DOCUMENTS

| | | | |
|---|---|---|---|
| EP | 0 652 576 | 5/1995 | H01G/9/028 |
| EP | 0 820 076 | 1/1998 | H01G/9/025 |
| EP | 0 825 626 | 2/1998 | H01G/9/15 |
| JP | 61-239617 | 5/1986 | H01G/9/02 |
| JP | 61-240625 | 10/1986 | H01G/9/02 |
| JP | 62-118509 | 5/1987 | H01G/9/02 |
| JP | 62-118511 | 5/1987 | H01G/9/24 |
| JP | 63-118323 | 5/1988 | C08G/61/12 |
| JP | 2-242816 | 9/1990 | C08G/61/12 |
| JP | 3-200313 | 9/1991 | H01G/9/02 |
| JP | 5-175082 | 7/1993 | H01G/9/02 |
| JP | 6-340754 | 12/1994 | C08J/7/04 |
| JP | 8-53566 | 2/1996 | C08J/9/28 |
| JP | 9-320901 | 12/1997 | H01G/9/028 |
| JP | 10-32145 | 2/1998 | H01G/9/028 |
| JP | 10-50558 | 2/1998 | H01G/9/028 |
| JP | 10-50559 | 2/1998 | H01G/9/028 |

* cited by examiner

*Primary Examiner*—Yogendra N. Gupta
*Assistant Examiner*—D G Hamlin
(74) *Attorney, Agent, or Firm*—Sughrue Mion, PLLC

(57) ABSTRACT

The present invention relates to a solid electrolytic capacitor comprising an electrode produced by forming a solid electrolytic layer comprised by a polymer having at least one repeating unit selected from a thiophene-diyl skeleton, an isothianaphthene-diyl skeleton, a pyrrole-diyl skeleton, a furan-diyl skeleton and an iminophenylene skeleton and having a fibril structure on a dielectric film layer of a porous valve-acting metal and its production method, and to a highly electroconductive polymer obtained by chemical oxidative polymerization of a monomer and an oxidizing agent at an interface and its production method.

18 Claims, 9 Drawing Sheets

600 nm 600 nm 5.90 μm

|← 600 nm →|

|—————————|
600 nm 15.0 μm

|←—————————→|

1.50 μm

|←— 600 nm —→|

|―――――――|
600 nm

ELECTRICAL CONDUCTING POLYMER, SOLID ELECTROLYTIC CAPACITOR AND MANUFACTURING METHOD THEREOF

CROSS REFERENCE

This application is a Continuation-in-Part application filed pursuant to 35 U.S.C. §111(a) and 35 U.S.C. §120 of earlier filed application Ser. No. 09/391,160, filed Sep. 8, 1999 and PCT Application PCT/JP93/03623, filed Jul. 5, 1998. This application also claims benefit pursuant to the provisions of 35 U.S.C. Section 119(e)(i) of earlier U.S. Provisional applications Serial Nos. 60/129,044 and 60/129,045 both filed on Apr. 13, 1999 according to the provisions of 35 U.S.C. Section 111(b).

TECHNICAL FIELD

The present invention relates to an electroconductive polymer, to a solid electrolytic capacitor containing an electroconductive polymer, and to methods for producing them. More specifically, the present invention relates to a solid electrolytic capacitor having a reduced size, high capacity, low impedance, good moisture resistant loading property and excellent heat resistance, and to a production method thereof as well as to a highly electroconductive polymer having a novel fibril structure for use in the capacitor and to a production method of the highly electroconductive polymer

BACKGROUND ART

The solid electrolytic capacitor is a capacitor element manufactured by forming a dielectric oxide film layer on an anode substrate comprising a metal foil which has a large specific surface area and has generally been subjected to etching treatment, forming a solid semiconductor layer (hereinafter simply referred to as a solid electrolyte) as an counter electrode outside the dielectric layer, preferably further forming an electrically conductive layer such as an electroconductive paste on the outer face of the electrode, and connecting a lead wire thereto. The element as a whole is completely sealed with an epoxy resin or the like and is widely used as a capacitor part in electrical articles.

To cope with the demands for digitization of electrical appliances or higher speed processing of personal computers in recent years, the capacitor used therefor is also required to be compact, have a large capacity and give a low impedance in a high frequency region.

As the compact capacitor having a large capacity, solid electrolytic capacitors such as aluminum electrolytic capacitor and tantalum electrolytic capacitor have been used. However, the aluminum electrolytic capacitor has a problem in that since an ion conducting liquid electrolyte is used as the electrolytic solution, the impedance is high in the high frequency region and the temperature characteristics are bad. The tantalum electrolytic capacitor has a problem in that since a manganese oxide is used as the electrolyte and the manganese oxide has a relatively high resistivity, the impedance in the high frequency region is high.

As means to solve these problems, it has been proposed to use an electroconductive polymer having electrically conductive properties as the solid electrolyte. For example, use of an electroconductive organic material comprising a π-conjugated polymer such as polyaniline (see, JP-A-61-239617 (the term "JP-A" as used herein means an "unexamined published Japanese patent application")), a polypyrrole (see, JP-A-61-240625), a polythiophene derivative (see, JP-A-2-15611 (U.S. Pat. No. 4,901,645)), a polyisothianaphthene not containing a dopant (see, JP-A-62-118509), a doped polyisothianaphthene (see, JP-A-62-118511) or an intrinsic conducting polymer having an electroconductivity of from $10^{-3}$ to $10^5$ S/cm (see, JP-A-1-169914 (U.S. Pat. No. 4,803,596)) has been proposed.

That is, polymers having a conjugated double bond represented by polymers of aniline, pyrrole, thiophene or the like generally have a specific electroconductivity and therefore, various investigations and developments have heretofore been made thereon. In particular, the electric, magnetic and optical properties peculiar to the π-electron conjugated system of the electroconductive polymer have been taken notice of. These electroconductive polymers have been mainly produced by an electrolytic polymerization method and a chemical oxidative polymerization method.

However, according to the conventional production method, if the low molecular weight polymer obtained by the redox reaction performed on the electrode surface has poor adhesion to the electrode surface, the low molecular weight polymer dissolves or deposits in the electrolytic solution. Furthermore, if an article having a large area is intended to obtain, an electrode having a size in proportion thereto must be used, accordingly, a serious problem arises with respect to the production cost.

On the other hand, in the case of using the chemical oxidative polymerization method, an electroconductive polymer can be easily obtained by mixing a polymerizable monomer with an appropriate oxidizing agent, therefore, this simple polymerization method has been taken notice of in industry and studies and developments thereof have been made.

However, the chemical oxidative polymerization method has the following serious problem. Since the polymerization rate is proportional to the activity of the oxidizing agent, an oxidizing agent having high activity must be used. But if the polymerization is performed using a highly active oxidizing agent, an adverse side reaction readily takes place and only a polymer reduced in the structural order and having a low electroconductivity can be obtained. This problem is considered to occur because an electroconductive polymer having a conjugated double bond produced stays in the reaction system for a long period of time, therefore, the polymer skeleton having the conjugated double bond is partially destroyed by the effect of excess oxidizing agent in the reaction system, as a result, the electroconductivity decreases.

Furthermore, the electroconductive polymer obtained by the electrolytic polymerization or chemical oxidative polymerization is generally insoluble and infusible, therefore, there is an operational problem particularly in that its after processing is very difficult.

In order to solve these problems, various attempts have been made. For example, JP-A-7-130579 (U.S. Pat. No. 5,567,209) discloses a production method of a solid electrolytic capacitor using an oxide film formed on a valve-acting metal as the dielectric layer and an electroconductive polymer formed on the dielectric layer as the solid electrolyte comprising a step of coating a monomer compound solution on the surface of the above-described dielectric oxide layer and drying it to form a solid monomer compound, and a step of contacting the solid monomer compound with an oxidizing agent solution to form an electroconductive polymer layer, thereby producing a solid electrolytic capacitor having a high capacity occurrence ratio and good high-frequency properties.

JP-A-6-340754 discloses a technique of allowing polycyclic aromatic amine compound to adhere to or impregnate into an insulating substrate and contacting the substrate with a solution containing an oxidizing agent to thereby oxidatively polymerize the polycyclic aromatic amine compound inside or on the surface of the substrate.

JP-A-10-50558 discloses a production method of a solid electrolytic capacitor as an application of the electroconductive polymer, comprising impregnating an electroconductive polymer as the cathode electrolyte into a capacitor element comprising an anode member having thereon a chemical formed layer, wherein the capacitor element is immersed in a solution obtained by dissolving an oxidizing agent in a monomer which becomes an electroconductive polymer by the oxidative polymerization, thereby forming an electroconductive polymer layer within the capacitor element, so that a compact capacitor having a large capacity can be produced.

JP-A-10-50559 discloses a technique, which is an application of the electroconductive polymer to a solid electrolytic capacitor comprising a step of immersing a capacitor element in an oxidizing agent solution and then evaporating the solvent component, thereby precipitating an oxidizing agent within the capacitor element, and a step of immersing the capacitor element in a solution containing a monomer which becomes an electroconductive polymer by the oxidative polymerization, thereby allowing the oxidizing agent to act on the monomer, so that high-temperature load properties can be improved.

Furthermore, JP-A-9-289141 (EP-A-803885) proposes a production method of a solid electrolytic capacitor, comprising immersing a porous electrode material in a monomer salt solution kept at a temperature higher than the dissolution temperature, cooling the porous material to precipitate the monomer salt on the surface thereof, and immersing the porous material in a solution containing an oxidizing agent.

As a solid electrolyte formed on the dielectric film layer, an electroconductive metal oxide and an electroconductive polymer have been had attention because they are expected to be basically possible for attaining a sufficiently high electroconductivity. However, they have a problem in that if the electroconductivity exceeds the proper range, the leakage current greatly increases to cause short circuit, whereas if the electroconductivity is low, the frequency properties are deteriorated and the capacity greatly decreases. As such, the control of the electroconductivity to fall within a proper range and the thermal stability of the solid electrolyte are still in need of improvement.

Conventional capacitors using an electroconductive polymer such as polypyrrole have a problem that the capacitor properties greatly fluctuate depending on the moisture resistance under load. In connection therewith, heat resistance is keenly demanded. For example, the resistance to heat by reflow soldering property at the formation from a capacitor element into a capacitor part is important and a capacitor element having high heat resistance is demanded. In other words, conventional techniques have a problem in the solid electrolyte produced on the oxide film layer and the production method thereof.

Specifically, the technique disclosed in JP-A-7-130579 (U.S. Pat. No. 5,567,209), in which the monomer compound solution is dried to form a solid-like monomer, has a problem in that the polymerization rate may decrease as the polymerization degree of the polymer composition increases since the diffusion of monomers are restricted in the solid monomer phase.

The technique disclosed in JP-A-6-340754 relates to a method for forming a transparent electroconductive thin film on an insulting material, and does not refer to the shape or performance of the polymer which has a fibril structure obtained by the polymerization positively effected at the interface.

The technique disclosed in JP-A-10-50558 is a technique of forming an electroconductive polymer thin film on a chemical formed film layer but an oxidizing agent is dissolved directly in the monomer which becomes an electroconductive polymer by the oxidative polymerization, therefore, the oxidative polymerization also proceeds in the monomer solution to form a polymer before and while it is used and it is difficult to maintain a uniform monomer solution all the time. Thus, this is an unstable production method failing in bringing out stable performance.

According to the technique disclosed in JP-A-10-50559, an oxidizing agent solution is introduced into pores, the solvent is evaporated to precipitate crystals of the oxidizing agent, and then the oxidative polymerization is performed. In view of the process, however, this is an inefficient production method in industry because a step of precipitating the oxidizing agent into pores on the chemical formed surface of a metal foil is indispensable and as duly understood, the area where the solid oxidizing agent contacts with the monomer is very small, therefore, the polymerization reaction proceeds slowly.

Furthermore, the technique disclosed in JP-A-9-289141 (EP-A-803885), in which the polymerizable monomer is solid has the same problem as in the technique disclosed in JP-A-10-50559.

DISCLOSURE OF THE INVENTION

An object of the present invention is to provide a highly electroconductive polymer having a conjugated double bond (π electron conjugated system) used advantageously as a solid electrolyte for a solid electrolytic capacitor.

Another object of the present invention is to provide a method for producing the above novel polymer having a conjugated double bond by way of oxidative polymerization, which polymer has an higher electroconductivity than other polymers having the same chemical composition.

Still another object of the present invention is to provide a solid electrolytic capacitor comprising the above highly electroconductive polymer as a solid electrolyte and having not only good initial properties but also excellent long-term reliability such as durability at high temperature and high humidity and a method for producing the same.

As a result of extensive investigations under these circumstances, it has been first found that slowly contacting a solution having dissolved therein a polymerizable monomer alone or together with an electrolyte having a doping action with a solution of an oxidizing agent having a polymerization initiating ability on an interface to polymerize the monomer can give rise to a highly electroconductive polymer having a scaly fibrillar structure and that practicing this polymerization method on a dielectric film layer and utilizing the resulting film composition having a fibril structure as a solid electrolyte can provide a capacitor excellent in initial properties (loss factor, leakage current, heat resistance, equivalent series resistance in high frequency regions, low impedance, etc.) and long term reliability (durability at high temperature and high humidity, etc.). The present invention has been accomplished based on this finding.

Therefore, the present invention provides the following solid electrolytic capacitor, its production method, electroconductive polymer and its production method:

[1] A solid electrolytic capacitor comprising a dielectric film layer on a porous valve-acting metal and a solid electrolytic layer comprised by a polymer having a fibril structure formed on said dielectric film layer.

[2] The solid electrolytic capacitor as described in [1] above, wherein the solid polymer electrolytic layer is an electroconductive polymer having a fibril structure comprising as a repeating unit a structure having a thiophene-diyl skeleton represented by the following general formula (1):

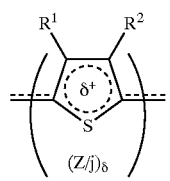
(1)

(wherein $R^1$ and $R^2$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^1$ and $R^2$ may combine with each other at any position to form a divalent chain for forming a 3-, 4-, 5-, 6- or 7-membered saturated or unsaturated hydrocarbon cyclic structure together with the carbon atoms substituted by $R^1$ and $R^2$, the cyclic bonded chain may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

[3] The solid electrolytic capacitor as described in [1] above, wherein the solid polymer electrolytic layer is an electroconductive polymer having a fibril structure comprising as a repeating unit a structure having a condensed polycyclic skeleton represented by the following general formula (2):

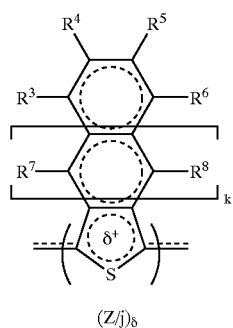
(2)

(wherein $R^3$, $R^4$, $R^5$, $R^6$, $R^7$ and $R^8$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^3$, $R^4$, $R^5$, $R^6$, $R^7$ or $R^8$ may combine with each other at any position to form a divalent chain for forming at least one 3-, 4-, 5-, 6- or 7-membered saturated or unsaturated hydrocarbon cyclic structure together with the carbon atoms substituted by $R^3$, $R^4$, $R^5$, $R^6$, $R^7$ or $R^8$, the cyclic bonded chain may optionally contain a bond such as carbonyl, ether, ester, amide, sulfide, sulfinyl, sulfonyl and imino at any position, k represents the number of condensed rings surrounded by the thiophene ring and the benzene ring having the substituents $R^3$ to $R^6$ and is 0 or an integer of from 1 to 3, the condensed ring in the formula may contain an optional number of nitrogen or N-oxide, with the proviso that the substituents $R^3$ to $R^8$ are deducted by the number of nitrogen or N-oxide, δ represents a number in the range of from 0 to 1, Z represents an anion, and j represents a valence of Z and is 1 or 2).

[4] The solid electrolytic capacitor as described in [1] above, wherein said solid polymer electrolytic layer is an electroconductive polymer having a fibril structure comprising as a repeating unit a structure having a pyrrole-diyl skeleton represented by the following general formula (3):

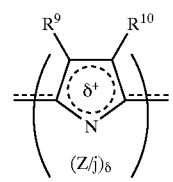
(3)

(wherein $R^9$ and $R^{10}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^9$ and $R^{10}$ may combine with each other at an optional position to form a divalent chain for forming at least one 3-, 4-, 5-, 6- or 7-membered saturated or unsaturated hydrocarbon cyclic structure together with the carbon atoms substituted by $R^9$ and $R^{10}$, and the cyclic bonded chain may optionally contain a bond such as carbonyl, ether, ester, amide, sulfide, sulfinyl, sulfonyl and imino at any position, δ represents a number in the range of from 0 to 1, Z represents an anion, and ; represents a valence of Z and is 1 or 2).

[5] The solid electrolytic capacitor as described in [1] above, wherein the solid polymer electrolytic layer is an electroconductive polymer having a fibril structure comprising as a repeating unit a structure having a furan-diyl skeleton represented by the following general formula (4):

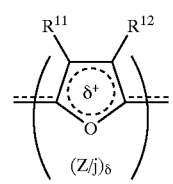
(4)

(wherein the substituents $R^{11}$ and $R^{12}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a CF₃ group, a phenyl group and a substituted phenyl group, the hydrocarbon chains of $R^{11}$ and $R^{12}$ may combine with each other at any position to form a divalent chain for forming at least one 3-, 4-, 5-, 6- or 7-membered saturated or unsaturated hydrocarbon cyclic structure together with the carbon atoms substituted by $R^{11}$ and $R^{12}$, the cyclic bonded chain may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

[6] The solid electrolytic capacitor as described in [1] above, wherein the solid polymer electrolytic layer is an electroconductive polymer having a fibril structure comprising as a repeating unit a structure having an iminophenylene skeleton represented by the following general formula (5):

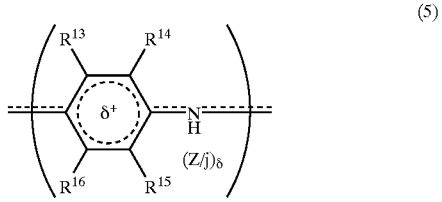

(5)

(wherein the substituents $R^{13}$, $R_{14}$, $R^{15}$ and $R^{16}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a CF₃ group, a phenyl group and a substituted phenyl group, the hydrocarbon chains of $R^{13}$, $R^{14}$, $R^{15}$ or $R^{16}$ may combine with each other at any position to form a divalent chain for forming at least one 3-, 4-, 5-, 6- or 7-membered saturated or unsaturated hydrocarbon cyclic structure together with the carbon atoms substituted by $R^{13}$, $R^{14}$, $R^{15}$ or $R^6$, the cyclic bonded chain may optionally contain a bond such as carbonyl, ether, ester, amide, sulfide, sulfinyl, sulfonyl and amino at any position, δ represents a number in the range of from 0 to 1, Z represents an anion, and j represents a valence of Z and is 1 or 2).

[7] The solid electrolytic capacitor as described in [2] above, wherein said solid polymer electrolyte has an electroconductivity of from about 0.1 to about 200 S/cm.

[8] A method for producing a solid electrolytic capacitor comprising a solid electrolytic layer composed of a polymer having a fibril structure on a dielectric film layer of a porous valve-acting metal, which comprises the step of contacting a polymerizable monomer with a single solution containing an oxidizing agent having a polymerization initiating ability kept in the saturated or supersaturated state or a mixed solution containing the oxidizing agent and an electrolyte having a doping action on said dielectric film, thereby forming a composition in the form of a film of a polymer having a fibril structure on said dielectric film.

[9] A method for producing a solid electrolytic capacitor, comprising a solid electrolytic layer composed of a polymer having a fibril structure on a dielectric film layer of a porous valve-acting metal, which comprises the step of contacting a solution having dissolved therein a polymerizable monomer alone or together with an electrolyte having a doping action with a single solution containing an oxidizing agent having a polymerization initiating ability kept in the saturated or supersaturated state or a mixed solution containing the oxidizing agent and an electrolyte having a doping action on said dielectric film, thereby forming a composition in the form of a film of a polymer having a fibril structure on said dielectric film.

[10] The method for producing a solid electrolytic capacitor as described in [8] above, which comprises the step of contacting on said dielectric film a polymerizable monomer represented by the following general formula (6):

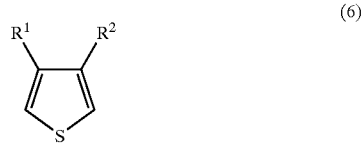

(6)

(wherein $R^1$ and $R^2$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a trihalomethyl group, a phenyl group and a substituted phenyl group, the hydrocarbon chains of $R^1$ and $R^2$ may combine with each other at any position to form a divalent chain for forming a 3-, 4-, 5-, 6- or 7-membered saturated or unsaturated hydrocarbon cyclic structure together with the carbon atoms substituted by $R^1$ and $R^2$, the cyclic bonded chain may optionally contain a bond such as carbonyl, ether, ester, amide, sulfide, sulfinyl, sulfonyl and imino at any position) with a solution containing an oxidizing agent having a polymerization initiating ability, thereby forming a composition in the form of a film of a polymer having a fibril structure on said dielectric film.

[11] The method for producing a solid electrolytic capacitor as described in [8] above, which comprises the step of contacting on said dielectric film a polymerizable monomer represented by the following general formula (7):

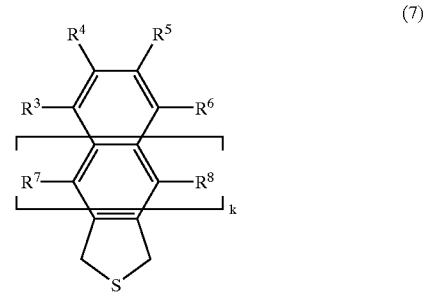

(7)

(wherein the substituents $R^3$, $R^4$, $R^5$, $R^6$, $R^7$ and $R^8$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a CF₃ group, a phenyl group and a substituted phenyl group, the hydrocarbon chains of $R^3$, $R^4$, $R^5$, $R^6$, $R^7$ or $R^8$ may combine with each other at any position to form a divalent chain for forming at least one 3-, 4-, 5-, 6- or 7-membered saturated or unsaturated hydrocarbon cyclic structure together with the carbon atoms substituted by $R^3$, $R^4$, $R^5$, $R^6$, $R^7$ or $R^8$, the cyclic bonded chain may optionally contain a bond such as carbonyl, ether, ester, amide, sulfide, sulfinyl, sulfonyl and imino at any position, k represents the number of condensed rings surrounded by the thiophene ring and the benzene ring having the substituents $R^3$ to $R^6$ and is 0 or an integer of from 1 to 3, the condensed ring in the formula may contain an optional number of nitrogen or N-oxide, with the proviso that the substituents $R^3$ to $R^8$ are deducted by the number of nitrogen or N-oxide) with a solution containing an oxidizing agent having a polymerization initiating ability, thereby forming a composition in the form of a film of a polymer having a fibril structure on said dielectric film.

[12] The method for producing a solid electrolytic capacitor as described in [8] above, which comprises the step of contacting on said dielectric film a polymerizable monomer represented by the following general formula (8):

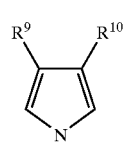

(8)

(wherein the substituents $R^9$ and $R^{10}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^9$ and $R^{10}$ may combine with each other at an optional position to form a divalent chain for forming at least one 3-, 4-, 5-, 6- or 7-membered saturated or unsaturated hydrocarbon cyclic structure together with the carbon atoms substituted by $R^9$ and $R^{10}$, and the cyclic bonded chain may optionally contain a bond such as carbonyl, ether, ester, amide, sulfide, sulfinyl, sulfonyl and amino at any position) with a solution containing an oxidizing agent having a polymerization initiating ability, thereby forming a composition in the form of a film of a polymer having a fibril structure on said dielectric film.

[13] The method for producing a solid electrolytic capacitor as described in [8] above, which comprises the step of contacting on said dielectric film a polymerizable monomer represented by the following general formula (9):

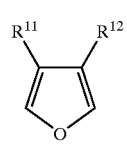

(9)

(wherein the substituents $R^{11}$ and $R^{12}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^{11}$ and $R^{12}$ may combine with each other at any position to form a divalent chain for forming at least one 3-, 4-, 5-, 6- or 7-membered saturated or unsaturated hydrocarbon cyclic structure together with the carbon atoms substituted by $R^{11}$ and $R^{12}$, the cyclic bonded chain may optionally contain a bond such as carbonyl, ether, ester, amide, sulfide, sulfinyl, sulfonyl and imino at any position) with a solution containing an oxidizing agent having a polymerization initiating ability, thereby forming a composition in the form of a film of a polymer having a fibril structure on said dielectric film.

[14] The method for producing a solid electrolytic capacitor as described in [8] above, which comprises the step of contacting on said dielectric film a polymerizable monomer represented by the following general formula (10):

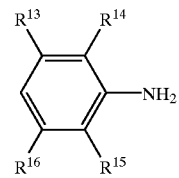

(10)

(wherein the substituents $R^{13}$, $R^{14}$, $R^{15}$ and $R^{16}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^{13}$, $R^{14}$, $R^{15}$ or $R^{16}$ may combine with each other at any position to form a divalent chain for forming at least one 3-, 4-, 5-, 6- or 7-membered saturated or unsaturated hydrocarbon cyclic structure together with the carbon atoms substituted by $R^{13}$, $R^{14}$, $R^{15}$ or $R^{16}$, the cyclic bonded chain may optionally contain a bond such as carbonyl, ether, ester, amide, sulfide, sulfinyl, sulfonyl and imino at any position) with a solution containing an oxidizing agent having a polymerization initiating ability, thereby forming a composition in the form of a film of a polymer having a fibril structure on said dielectric film.

[15] The method for producing a solid electrolytic capacitor as described in [9] above, wherein the polymerizable monomer has a concentration of from 0.01 to 5 mol/L.

[16] The method for producing a solid electrolytic capacitor as described in [8] above, wherein the electrolyte having a doping action has a concentration of from 0.001 to 2.5 mol/L.

[17] The method for producing a solid electrolytic capacitor as described in [8] above, wherein the oxidizing agent having a polymerization initiating ability is at least one compound selected from persulfates, bichromates and trivalent iron salts.

[18] The method for producing a solid electrolytic capacitor as described in [8] above, wherein the concentration of the oxidizing agent having a polymerization initiating ability is from 0.01 to 5 times the concentration of the polymerizable monomer.

[19] The method for producing a solid electrolytic capacitor as described in [8] above, wherein the step of forming a solid polymer electrolyte is repeated from 2 to 30 times to form compositions each of which is in the form of a film.

[20] A highly electroconductive polymer having a fibril structure comprising as a repeating unit a structure having a thiophene-diyl skeleton represented by the following general formula (1):

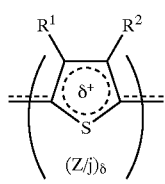

(1)

(wherein the substituents $R^1$ and $R^2$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group. The hydrocarbon chains of $R^1$ and $R^2$ may combine with each other at any position to form a divalent chain for forming a 3-, 4-, 5-, 6- or 7-membered saturated or unsaturated hydrocarbon cyclic structure together with the carbon atoms substituted by $R^1$ and $R^2$, the cyclic bonded chain may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

[21] A highly electroconductive polymer having a fibril structure comprising as a repeating unit a structure having a condensed polycyclic skeleton represented by the following general formula (2):

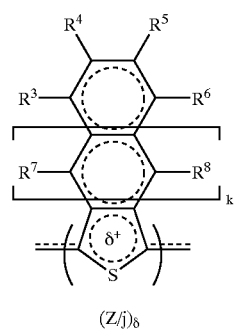

(2)

(wherein the substituents of $R^3$, $R^4$, $R^5$, $R^6$, $R^7$ and $R^8$ each independently represent a monovalent group selected from the group consisting of a hydrogen atom, a linear or branched, saturated or unsaturated alkyl, alkoxy and alkyl ester group having from 1 to 10 carbon atoms, a halogen atom, a nitro group, a cyano group, a primary, secondary or tertiary amino group, a $CF_3$ group, a phenyl group and a substituted phenyl group. The hydrocarbon chains of $R^3$, $R^4$, $R^5$, $R^6$, $R^7$ or $R^8$ may combine with each other at any position to form a divalent chain for forming at least one 3-, 4-, 5-, 6- or 7-membered saturated or unsaturated hydrocarbon cyclic structure together with the carbon atoms substituted by $R^3$, $R^4$, $R^5$, $R^6$, $R^7$ or $R^8$, the cyclic bonded chain may optionally contain a bond such as carbonyl, ether, ester, amide, sulfide, sulfinyl, sulfonyl and imino at any position, k represents the number of condensed rings surrounded by the thiophene ring and the benzene ring having the substituents $R^3$ to $R^6$ and is 0 or an integer of from 1 to 3, the condensed ring in the formula may optionally contain nitrogen or N-oxide, with the proviso that the substituents $R^3$ to $R^8$ are deducted by the number of nitrogen or N-oxide, δ represents a number in the range of from 0 to 1, Z represents an anion, and j represents a valence of Z and is 1 or 2).

[22] A highly electroconductive polymer having a fibril structure comprising as a repeating unit a structure having a pyrrole-diyl skeleton represented by the following general formula (3):

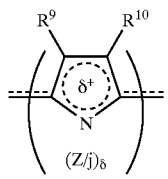

(3)

(wherein $R^9$ and $R^{10}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^9$ and $R^{10}$ may combine with each other at an optional position to form a divalent chain for forming at least one 3-, 4-, 5-, 6- or 7-membered saturated or unsaturated hydrocarbon cyclic structure together with the carbon atoms substituted by $R^9$ and $R^{10}$, and the cyclic bonded chain may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

[23] A highly electroconductive polymer having a fibril structure comprising as a repeating unit a structure having a furan-diyl skeleton represented by the following general formula (4):

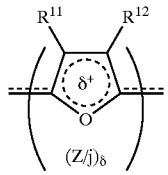

(4)

(wherein the substituents $R^{11}$ and $R^{12}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^{11}$ and $R^{12}$ may combine with each other at any position to form a divalent chain for forming at least one 3-, 4-, 5-, 6- or 7-membered saturated or unsaturated hydrocarbon cyclic structure together with the carbon atoms substituted by $R^{11}$ and $R^{12}$, the cyclic bonded chain may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

[24] A highly electroconductive polymer having a fibril structure comprising as a repeating unit a structure having an iminophenylene skeleton represented by the following general formula (5):

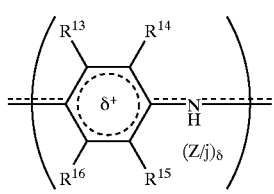
(5)

(wherein the substituents $R^{13}$, $R^{14}$, $R^{15}$ and $R^{16}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^{13}$, $R^{14}$, $R^{15}$ or $R^{16}$ may combine with each other at any position to form a divalent chain for forming at least one 3-, 4-, 5-, 6- or 7-membered saturated or unsaturated hydrocarbon cyclic structure together with the carbon atoms substituted by $R^{13}$, $R^{14}$, $R^{15}$ or $R^{16}$, the cyclic bonded chain may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

[25] A method for producing a highly electroconductive polymer having a fibril structure, comprising contacting at least one polymerizable monomer represented by the following general formula (6):

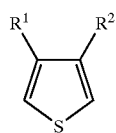
(6)

(wherein $R^1$ and $R^2$ have the same meanings as in [10] above); the general formula (7):

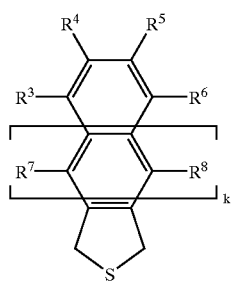
(7)

(wherein $R^3$, $R^4$, $R^5$, $R^6$, $R^7$ and $R^8$ have the same meanings as in [11] above); the general formula (8):

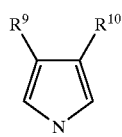
(8)

(wherein $R^9$ and $R^{10}$ have the same meanings as in [12] above); the general formula (9):

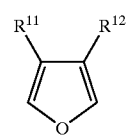
(9)

(wherein $R^{11}$ and $R^{12}$ have the same meanings as in [13] above); or the general formula (10):

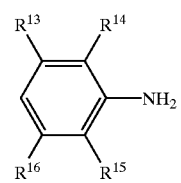
(10)

(wherein $R^{13}$, $R^{14}$, $R^{15}$ and $R^{16}$ have the same meanings as in [14] above) with a solution containing an oxidizing agent having a polymerization initiating ability such that an interface is formed therebetween, and performing polymerization at said interface.

[26] The method for producing a highly electroconductive polymer having a fibril structure as described in [25] above, comprising contacting a solution obtained by dissolving at least one polymerizable monomer represented by formula (6), (7), (8), (9) or (10) as described in [25] above in a solvent with a solution containing an oxidizing agent having a polymerization initiating ability such that an interface is formed therebetween, and performing polymerization at said interface.

[27] The method for producing a highly electroconductive polymer having a fibril structure as described in [25] above, wherein the solution containing an oxidizing agent having a polymerization initiating ability contains an electrolyte having a doping action.

[28] The method for producing a highly electroconductive polymer having a fibril structure as described in [25] above, wherein the solution containing an oxidizing agent having a polymerization initiating ability is a saturated or supersaturated solution.

[29] The method for producing a highly electroconductive polymer having a fibril structure as described in [25] above, wherein a saturated solution of an oxidizing agent having a polymerization initiating ability is produced, the oxidizing agent solution is contacted with the polymerizable monomer at a temperature lower than the temperature at the production of said saturated solution to form a interface, and then polymerization is performed.

[30] The method for producing a highly electroconductive polymer having a fibril structure as described in [25] above, wherein the oxidizing agent having a polymerization initiating agent is at least one of a persulfate, a bichromate and a trivalent iron salt.

[31] The method for producing a highly electroconductive polymer having a fibril structure as described in [26] above, wherein the solvent is a hydrophilic organic solvent capable of dissolving the polymerizable monomer.

[32] The method for producing a highly electroconductive polymer having a fibril structure as described in [25] above, wherein the polymerizable monomer is contacted with the solution containing an oxidizing agent to produce a highly electroconductive polymer having a fibril structure and after washing or not washing the polymer, the method for producing a highly electroconductive polymer having a fibril structure described in [25] above is performed two or more times on the surface of the highly electroconductive polymer having a fibril structure to stack polymer composition layers.

[33] The method for producing a highly electroconductive polymer having a fibril structure as described in [26] above, wherein the polymerizable monomer is contacted with the solution containing an oxidizing agent to produce a highly electroconductive polymer having a fibril structure and after washing or not washing the polymer, the method for producing a highly electroconductive polymer having a fibril structure described in [26] above is performed two or more times on the surface of the highly electroconductive polymer having a fibril structure to stack polymer composition layers.

DETAILED DESCRIPTION OF THE INVENTION

Figure 2:
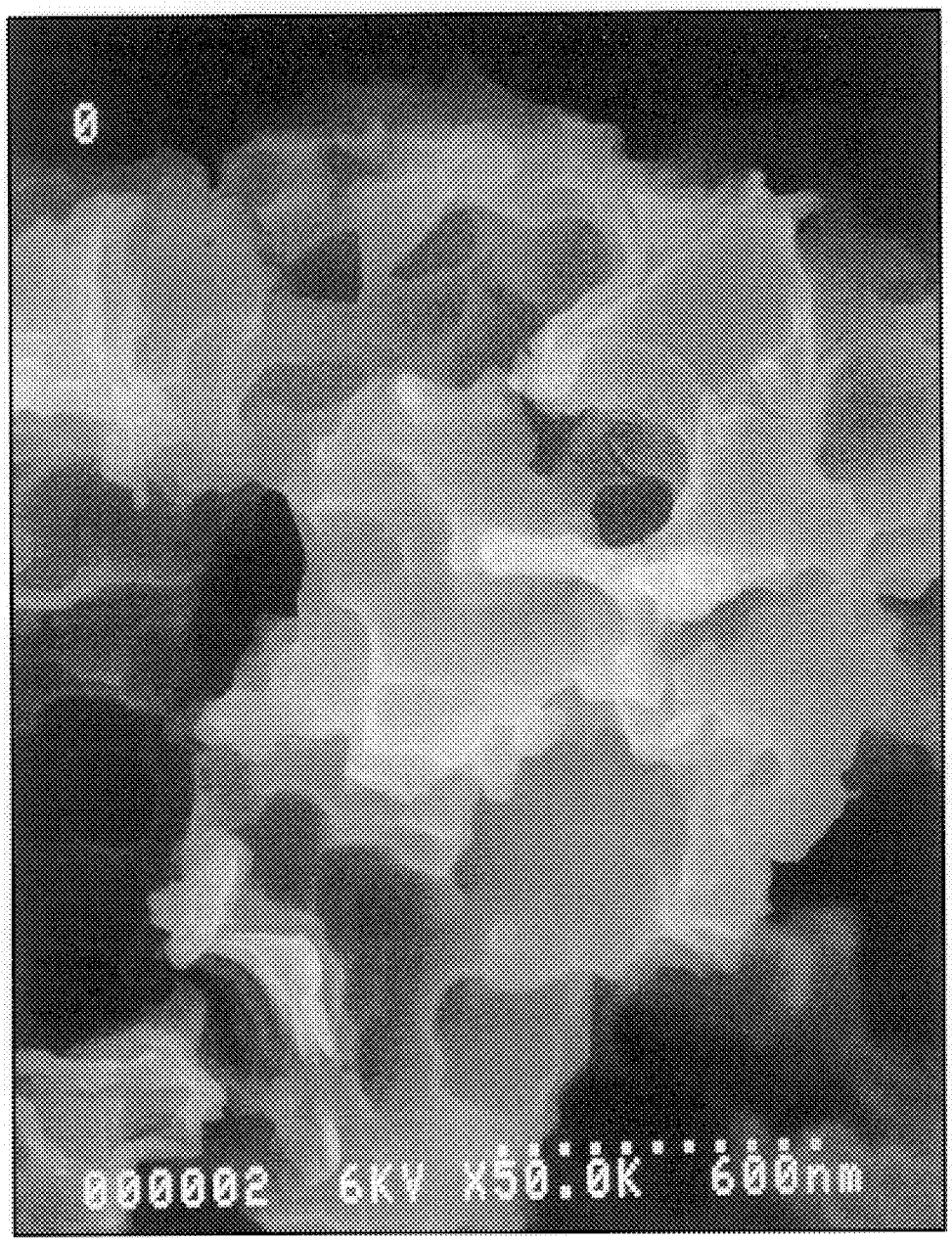
FIG. 2 is a photograph (×50,000) by scanning electron microscopy of a formed aluminum foil.
Figure 7:
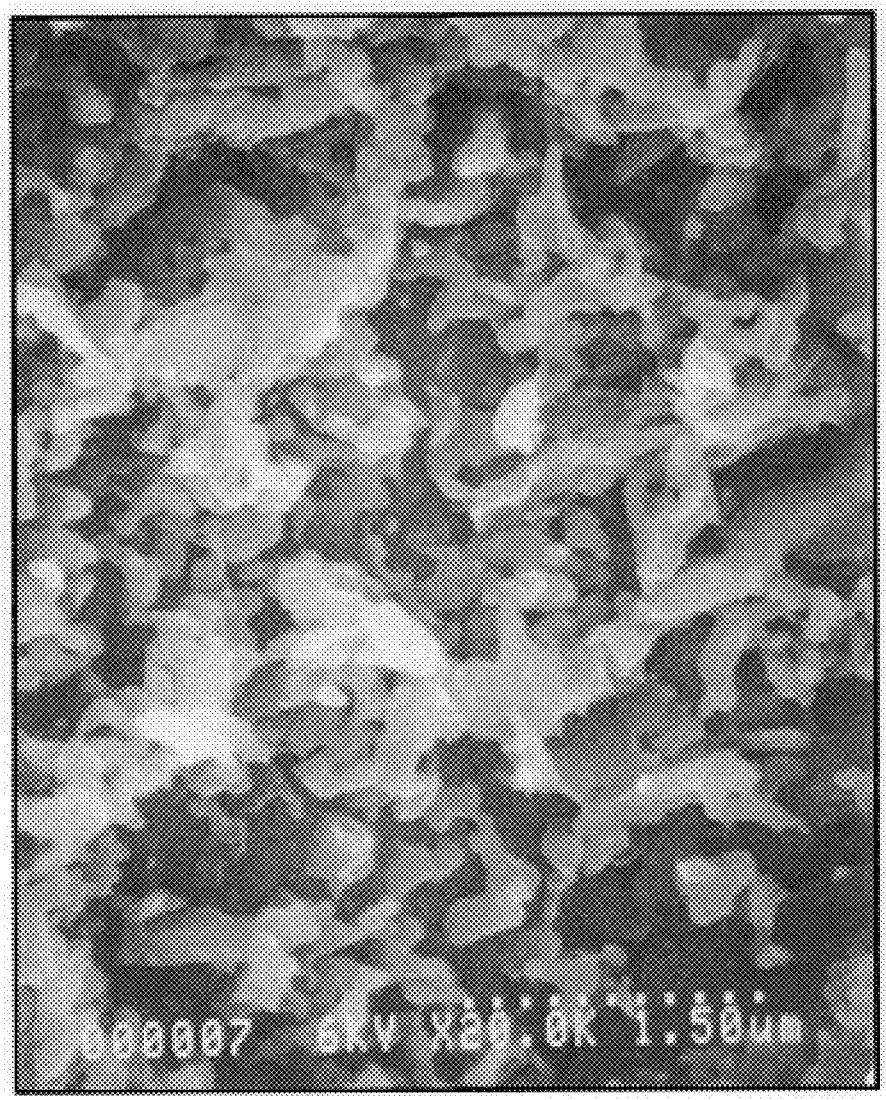
FIG. 7 is an enlarged photograph (×20,000) by scanning electron microscopy of the fibril structure moiety of the highly electroconductive polymer of FIG. 6.

The highly electroconductive polymer having a fibril structure comprising a chemical structure represented by formula (1), (2), (3), (4) or (5) as a repeating unit according to the present invention has heretofore not been present. This is apparent from the fact that the difference between this polymer and the polymer produced using a polymerizable monomer (6), (7), (8), (9) or (10) and an oxidizing agent having a polymerization initiating ability under the stirring condition can be clearly seen from the comparison between FIG. 2 or 7 showing a fibril structure and FIG. 5 or 9 not showing a fibril structure. In particular, as is apparent from the Examples 12, 13, 15, and 16 and Comparative Examples 2, 3, 4 and 5 which will be described later, those having a fibril structure and those not having a fibril structure greatly differ in the electroconductivity.

Although the specific reason why the polymer having a fibril structure according to the present invention shows high electroconductivity is unclear, one of causes therefor is considered that in the present invention, a solution containing an oxidizing agent having a polymerization initiating ability, preferably a solution having a high concentration, more preferably a saturated or supersaturated solution (hereinafter these two solutions are simply referred to as "a saturated solution and the like") is calmly contacted with a polymerizable monomer or a solution containing a polymerizable monomer so as to form an interface (the "interface" as used in the present invention means one in such a state such that mutual dissolution partially takes place at the surface where an oxidizing agent solution layer contacts a polymerizable monomer layer or a solution layer containing a polymerizable monomer and despite the presence of a layer graded in the concentration, respective layers are individually present) and the polymerization proceeds at this interface, therefore, the electroconductive polymer produced is free of effect of excess oxidizing agent and the structural regularity thereof is not destroyed.

As another reason, it is considered that an oxidizing agent is used in the form of a high concentration solution or a saturated solution and the like and at this time, the oxidizing agent seems to be present in the state of a very small crystal nucleus, therefore, polymerization of the polymerizable monomer proceeds on the limited reaction field on the crystal nucleus surface, as a result, the highly electroconductive polymer produced has a high steric order. By these two reasons, a highly electroconductive polymer having an electroconductivity as high as from 10 to 1,000 times the electroconductivity of a polymer having the same composition obtained from the same polymerizable monomer is considered to yield and appear as a fibril structure in the image by scanning electron microscopy (SEM).

Examples of the thiophene derivative represented by general formula (6) as a starting material of the highly electroconductive polymer include 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-methylenedioxythiophene, 3,4-ethylene dioxythiophene and 3,4-propylenedioxythiophene. However, the present invention is by no means limited thereto.

Specific examples of the condensed heteropolycyclic compound represented by general formula (7) as a starting material of the highly electroconductive polymer include compounds having a 1,3-dihydroisothianaphthene skeleton (another name: 1,3-dihydrobenzo[c]thiophene) when k is 0, compounds having a 1,3-dihydronaphtho[2,3-c]thiophene skeleton when k is 1, compounds having a 1,3-dihydroanthra[2,3-c] thiophene skeleton and compounds having a 1,3-dihydronaphthaceno[2,3-c]thiophene skeleton. However, the present invention is by no means limited thereto.

The condensed heteropolycyclic compound of general formula (7) where two adjacent substituents out of the substituents $R^3$, $R^4$, $R^5$ and $R^6$ are combined with each other through an unsaturated bond to form a condensed 6-membered ring (ortho substitution) may also be used and examples thereof include 1,3-dihydronaphtho[ 1,2-c] thiophene derivatives when k is 0, 1,3-dihydrophenanthra[2,3-c]thiophene derivatives and 1,3-dihydrotriphenylo[2,3-c]thiophene derivatives when k is 1 and 1,3-dihydrobenzo[a]anthraceno[7,8-c]thiophene derivatives when k is 2. However, the present invention is by no means limited thereto.

Furthermore, the condensed ring may optionally contain nitrogen or N-oxide and examples thereof include 1,3- dihydrothieno[3,4-b]quinoxaline, 1,3-dihydrothieno[3,4-b] quinoxaline-4-oxide and 1,3-dihydrothieno[3,4-b] quinoxaline-4,9-dioxide when k is 0. However, the present invention is by no means limited thereto.

Examples of the pyrrole derivative represented by general formula (8) as a starting material of the highly electroconductive polymer include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-methylenedioxypyrrole, 3,4-ethylenedioxypyrrole, 3,4-propylenedioxypyrrole, 3,4-dimethylpyrrole, 3,4-diethylpyrrole. However, the present invention is by no means limited thereto.

Examples of the furan derivative represented by general formula (9) as a starting material of the highly electroconductive polymer include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-methylenedioxyfuran, 3,4-ethylenedioxyfuran, 3,4-propylenedioxyfuran. However, the present invention is by no means limited thereto.

Examples of the aniline derivative represented by general formula (10) as a starting material of the highly electroconductive polymer include derivatives such as 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline and 2-cyanoaniline. However, the present invention is by no means limited thereto.

Preferred examples of the substituted phenyl group described in the above general formulae (1) to (10) include phenyl groups substituted at any of o-, m-, or p-position with at least one member selected from the group consisting of a $CF_3$ group, Br, Cl, F, a methyl group, an ethyl group, a cyano group, and a nitro group.

Examples of the valve-acting metal which can be used in the solid electrolytic capacitor of the present invention include a single metal such as aluminum, tantalum, niobium, titanium, zirconium, magnesium or silicon, and an alloy thereof. The metal may have any shape as far as it has a porous formed shape, and examples thereof include a rolled foil subjected to etching and a powder sintered body.

The oxidizing agent for use in the production of an electroconductive polymer of the present invention may be any as far as the oxidizing agent can satisfactorily attain dehydrogenating four electron oxidation reaction, and a compound which is industrially inexpensive and easy to handle in the production is preferred. Specific examples thereof include Fe(III)-type compounds such as $FeCl_3$, $Fe(ClO_4)_3$ and Fe (organic acid anion) salt, anhydrous aluminum chloride/cuprous chloride, alkali metal persulfates, ammonium persulfates, peroxides, manganates such as potassium permanganate, quinones such as 2,3-dichloro-5,6-dicyano-1,4-benzoquinone (DDQ), tetrachloro-1,4-benzoquinone and tetracyano-1,4-benzoquinone, halogens such as iodine and bromine, peracid, sulfuric acid, fuming sulfuric acid, sulfur trioxide, chlorosulfuric acid, fluorosulfuric acid, sulfonic acids such as sulfamic acid, ozone and a combination of a plurality of these oxidizing agents.

Examples of the basic compound of the organic acid anion constituting the organic acid anion iron(III) salt include an organic sulfonic acid, an organic carboxylic acid, an organic phosphoric acid and an organic boric acid. Specific examples of the organic sulfonic acid include benzenesulfonic acid, p-toluenesulfonic acid, methanesulfonic acid, ethanesulfonic acid, α-sulfo-naphthalene, β-sulfo-naphthalene, naphthalenedisulfonic acid and alkylnaphthalenesulfonic acid (examples of the alkyl group include butyl, truisopropyl and di-t-butyl).

Specific examples of the organic carboxylic acid include acetic acid, propionic acid, benzoic acid and oxalic acid. Furthermore, polyelectrolyte anions such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid may be used. These are set forth only for the purpose of illustrating examples and the organic sulfonic acid or the organic carboxylic acid of the present invention is by no means limited thereto.

Examples of the counter anion of the above-described anion include $H^+$, alkali metal ions such as $Na^+$ and $K^+$, and ammonium ions substituted by a hydrogen atom, a tetramethyl group, a tetraethyl group, a tetrabutyl group or a tetraphenyl group, however, the counter anion is not particularly limited in the present invention. Among those oxidizing agents, oxidizing agents containing a trivalent Fe-type compound, a cuprous chloride-type compound, an alkali persulfate, an ammonium persulfate, a manganic acid or a quinone are preferred.

The solution of the oxidizing agent having a polymerization initiating ability may have any concentration as far as the polymerization can take place, but preferably has a high concentration. The solution is more preferably a saturated or supersaturated solution. With respect to the method of using the solution as a saturated or supersaturated solution, a temperature slightly higher than the reaction temperature is used. Although the temperature may vary depending on the temperature dependency of the warm solubility of the oxidizing agent, when the temperature dependency is large, a small temperature difference is used and when the temperature dependency is small, a large temperature difference is used. For example, the oxidizing agent is dissolved in a solvent such as water or alcohol with vigorous stirring at a temperature from a few degree to about 20° C. higher than the polymerization temperature and the supernatant of the oxidizing solution is taken out, placed in a reaction vessel and set to a predetermined temperature lower than the temperature at the dissolution. Then, a polymerizable monomer or a solution thereof is calmly supplied to the upper surface of the oxidizing agent solution so that mixing of these two solutions can be prevented as much as possible and an interface can be formed therebetween.

The reaction proceeds at the interface between the two solutions and a highly electroconductive polymer is produced. The polymer is separated from the reaction solution by evaporation, decantation or the like and washed. As a result, a highly electroconductive polymer is obtained as a macroscopically scaly material. This may be used as a product highly electroconductive polymer after thorough washing. Alternatively, on the polymer produced which is washed or not washed, a solution of an oxidizing agent having a polymerization initiating ability may be again contacted with a polymerizable monomer or a solution containing a polymerizable monomer. By repeating this process two or more times, highly electroconductive polymer layers may be stacked.

Also in this case, the solution of the oxidizing agent may have any concentration as far as the polymerization can proceed but preferably has a high concentration. A saturated or supersaturated solution is more preferred.

The method for preparing the saturated or supersaturated conditions of the oxidizing agent having a polymerization initiating ability on a dielectric film layer is not limited particularly. It may be a method in which a high concentration solution of the oxidizing agent as it is is introduced into the pores of a foil or a method in which a low concentration solution is introduced in the pores of a foil in advance so that impregnation occurs sufficiently and dried by leaving it to stand or by heating to induce saturated or supersaturated conditions.

In the production method of a highly electroconductive polymer of the present invention, the oxidizing agent anion (reductant of the oxidizing agent) yielded from the oxidizing agent acts as a dopant, therefore, a doping step may be dispensed with. The reductant and another electrolyte having a doping action are preferably used in combination by allowing the electrolyte to be present at the polymerization.

Examples of the electrolyte having a doping action which is if desired allowed to be present together in the production of a polymer composition for use in the present invention include electrolyte compounds having an oxidizing agent anion (reductant of oxidizing agent) produced from the above-described oxidizing agent as the counter anion, and other anionic electrolytes.

Specific examples thereof include Group 5B element halide anions such as $PF_6^-$, $SbF_6^-$ and $AsF_6^-$, Group 3B element halide anions such as $BF_4^-$, halogen anions such as $I^-(I_3^-)$, $Br^-$ and $Cl^-$, halogen acid anions such as $ClO_4^-$, Lewis acid anions such as $AlCl_4^-$, $FeCl_4^-$ and $SnCl_5^-$, and protonic acid anions such as inorganic acid anion (e.g., $NO_3^-$, $SO_4^{2-}$), organic sulfonic acid anion (e.g., p-toluenesulfonic acid, naphthalenesulfonic acid, naphthalenesulfonic acid substituted with alkyl group having from 1 to 5 carbon atoms, anthraquinonesulfonic acid, $CF_3SO_3^-$, $CH_3SO_3^-$) and carboxylic acid anion (e.g., $CF_3COO^{31}$, $C_6H_5COO^-$).

Furthermore, polyelectrolyte anions such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid may be used but the present invention is by no means limited thereto. Among these, high molecular or low molecular organic sulfonic acid compounds and polyphosphoric acids are preferred, and aromatic sulfonic acid compounds are more preferred.

The concentration of the polymerizable monomer represented by one of the general formulae (6) to (10) above for use in the production of the electroconductive polymer of the present invention varies depending on the kind of the substituent of the compound, the kind of the solvent, the kind of another monomer which may be copolymerized or the amount thereof, but, in general, it is preferably from $10^{-3}$ to 10 mol/L, more preferably from $10^{-2}$ to 5 mol/L.

The reaction temperature varies depending on the kind of monomer, solvent or oxidizing agent and the reaction method and cannot be specifically limited but it is preferably a temperature capable of maintaining the oxidizing agent in the saturated state at the initiation of polymerization. After the initiation of polymerization, the solvent is evaporated and the oxidizing agent precipitates as a solid. In this case, when the polymerizable monomer is present as a liquid phase, the interface of the polymerization system is maintained and the polymerization continuously proceeds. The reaction temperature is generally from −70 to 250° C., preferably from 0 to 150° C., more preferably from 15 to 100° C.

The reaction solvent for use in the production method of the present invention may be any solvent as far as the monomer, the oxidizing agent and the electrolyte having a doping action can dissolve therein together or individually. Examples thereof include ethers such as tetrahydrofuran (THF), dioxane and diethyl ether, aprotic polar solvents such as dimethylformamide, acetonitrile, benzonitrile, N-methylpyrrolidone (NMP) and dimethylsulfoxide (DMSO), esters such as ethyl acetate and butyl acetate, non-aromatic chlorine-type solvents such as chloroform and methylene chloride, nitro compounds such as nitromethane, nitroethane and nitrobenzene, alcohols such as methanol, ethanol and propanol, organic acids such as formic acid, acetic acid and propionic acid, acid anhydrides of the organic acid (e.g., acetic acid anhydride), water, and a mixed solvent thereof. Furthermore, a two-liquid or three-liquid system where the oxidizing agent and/or the electrolyte having a doping action and the monomer are individually dissolved may also be used.

The highly electroconductive polymers containing the chemical structures represented by the general formulae (1) to (5) and having a fibril structure can be obtained from the polymerizable monomers represented by the general formulae (6) to (10), respectively.

The thus-obtained electroconductive polymer has a very high electroconductivity which is 10 to 1,000 folds higher than that of the electroconductive polymer obtained by producing in a reaction system of an oxidizing agent having a polymerization initiating ability and a polymerizable monomer in a stirring state, more specifically it has an electroconductivity in the range of from about 0.1 to about 200 S/cm, and in the preferred conditions, the electroconductivity is from 1 to 100 S/cm, more preferably from 10 to 100 S/cm.

The thus-produced electroconductive polymer layer as a solid electrolytic layer of a solid electrolytic capacitor usually can have a thickness as small as from 0.1 to 0.3 μm by a single polymerization step. Therefore, on the surface (at a porous valve-acting metal) of the electroconductive polymer having a fibril structure obtained by contacting the polymerizable monomer with the oxidizing agent having a polymerization initiating ability to produce an electroconductive polymer and washing or not washing the polymer, the same operation is preferably performed at least about 3 times, practically 5 times or more, thereby synthesizing solid polymers. However, it is not preferred that the solid electrolytic layer has a thickness in excess of the thickness required. The thickness required for the solid electrolytic layer can be usually obtained by repeating the operation about 20 to 25 times, preferably approximately from 7 to 25 times.

On the thus-formed electroconductive polymer layer, an electrically conductive layer is preferably provided so as to attain good electrical contact with the cathode lead terminal. The electrically conductive layer is provided, for example, by solidifying or plating an electroconductive paste, vaporizing a metal or forming an electroconductive resin film. Thereafter, a cathode lead terminal is connected and the capacitor is jacketed with a resin mold, a resin case or a metal-made jacket case or by resin dipping, then, a solid electrolytic capacitor for various uses can be obtained.

In the solid electrolytic capacitor of the present invention, a highly electroconductive polymer in the fibril structure as a solid electrolyte on the electrode covers the oxide layer within the pores of a porous valve-acting metal foil subjected to chemical forming, a fibril layer structure is formed inside the cathode and on the outer surface of the metal foil by repeating the polymerization multiple times, and void spaces partially remain between adjacent layers, therefore, the thermal stress can be effectively mitigated against rising or falling of the temperature. Pores are formed also on the surface of the electroconductive polymer composition, therefore, the electroconductive paste for connection can enter the pores on the outer surface and thereby good adhesion can be achieved. Furthermore, void spaces are formed also in pores due to the presence of an electroconductive polymer in the fibril structure or by the lamination in a plurality of times, therefore, oxygen is supplied without fail and the recoverability of the dielectric oxide layer at the time of passing electricity is improved.

The polymer having a fibril structure formed on the dielectric film of a solid electrolytic capacitor is of the shape preferably having an outer diameter in the range of about 3 nm to about 100 nm, more preferably in the range of about 5 nm to about 50 nm.

BEST MODE FOR CARRYING OUT THE INVENTION

Hereafter, the present invention will be described in greater detail by way of examples and comparative examples. However, these should not be construed as limiting the scope of the present invention.

EXAMPLE 1

An aluminum foil chemical formed by etching was cut into a size of 3 mm×10 mm and a polyimide solution was coated in a width of 1 mm on both surfaces so as to occupy the middle portion of the 10-mm surface and thereby divide the surface into a 4-mm moiety and a 5-mm moiety, and dried to form a masking. The 3 mm×4 mm moiety of the aluminum foil chemical formed by etching was subjected to a chemical forming treatment with a 10 wt % aqueous ammonium adipate solution while applying thereto a voltage of 13 V to form a dielectric oxide layer.

Thereafter, this 3 mm×4 mm moiety of aluminum foil was immersed in 2 mol/L of an aqueous ammonium persulfate solution (Solution 1), pulled up and then dried at room temperature for 3 minutes. Subsequently, the 3 mm×4 mm moiety of aluminum foil was immersed in 1 mol/L of an isopropanol solution of 3,4-ethylenedioxythiophene (Solution 2), pulled up and then left standing in an atmosphere of 40° C. for 10 minutes, thereby performing oxidative polymerization. The operation from the immersing in Solution 1 and then in Solution 2 until the oxidative polymerization was performed was repeated 20 times. Thereafter, the aluminum foil was washed with warm water at 50° C. for 10 minutes and then dried at 100° C. for 30 minutes to form an electroconductive polymer layer.

Figure 1:
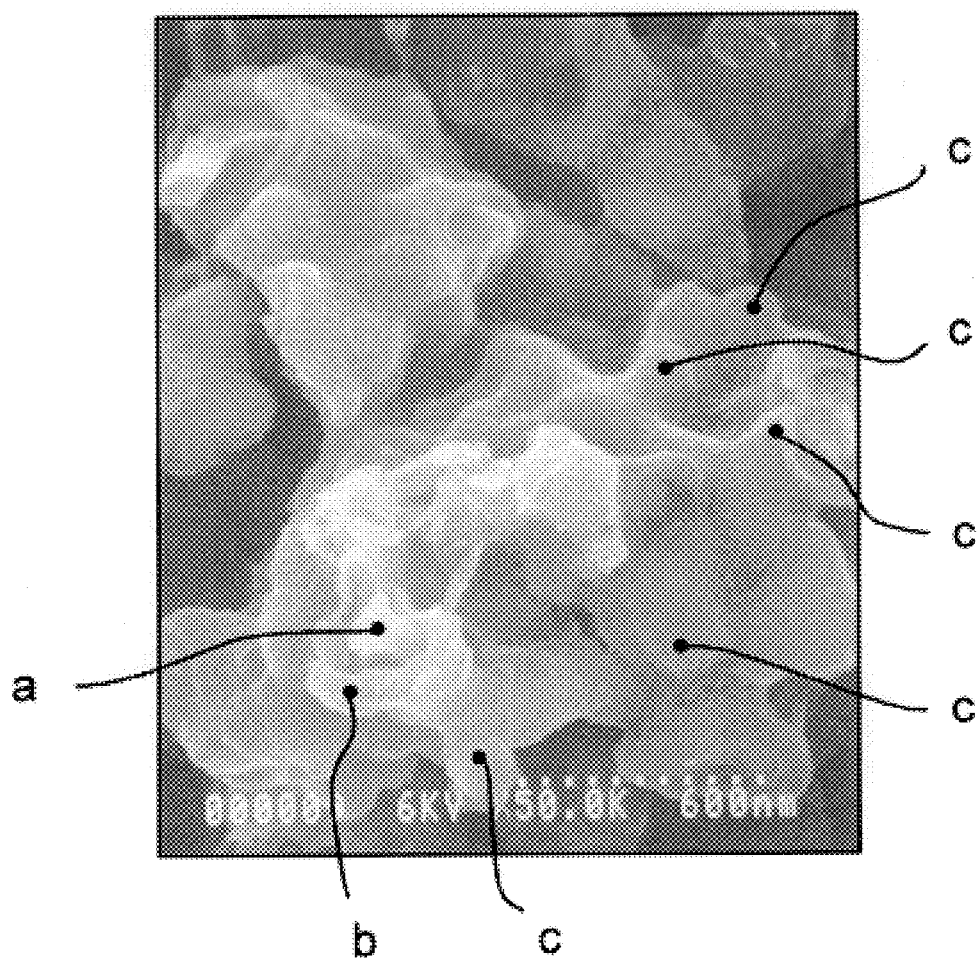
FIG. 1 is a photograph (×50,000) by scanning electron microscopy of the cross section of an anode aluminum foil having formed thereon an electroconductive polymer layer obtained in Example 1 of the present invention.
Figure 1:

FIG. 1 is a photograph (cross section of aluminum foil) by scanning electron microscopy at a 50,000 magnification of the electroconductive polymer layer obtained in this Example. FIG. 2 is a photograph (cross section of aluminum foil) by scanning electron microscopy at a 50,000 magnification of the aluminum foil subjected to the chemical forming treatment.

Also referring to FIG. 2 for comparison, it can be seen that in the FIG. 1, (a) shows the aluminum metal moiety of the fine structure, (b) shows the oxidized alumina dielectric moiety, and (c) shows the fibrillar electroconductive polymers deposited on the surface of the dielectric moiety assembling in a cluster (in FIG. 1, the fibrils look like a network patterned film), and that the electroconductive polymer film had a thickness of about 0.06 $\mu$m. The observation of FIG. 1 reveals that the outer diameter of the fibril is approximately 5 to 50 nm. The structure of fibrillar electroconductive polymer (film-like) moiety (c) has a structure similar to that of the highly electroconductive polymer obtained by reacting "3,4-ethylenedioxythiophene" and "polymerization initiator (containing an oxidizing agent)" at an interface as described in Examples 14 and 15.

On the portion having formed thereon an electroconductive polymer layer of the aluminum foil, carbon paste and silver paste were coated. Four sheets of the aluminum foils were stacked, a cathode lead terminal was connected, and an anode lead terminal was connected by welding to the aluminum foil portion where the electroconductive polymer layer was not formed. Thereafter, this element was sealed by epoxy resin and then aged at 125° C. for 2 hours while applying thereto a rated voltage. Through such an operation, 30 capacitors in total were completed.

These 30 capacitor elements were measured on the capacity, loss factor (tan δ) at 120 Hz, and the impedance at a resonance frequency and the leakage current as the initial evaluation. The leakage current was measured one minute after the rated voltage was applied. The average of respective measured values, the defective ratio when the leakage current of 0.16 $\mu$A (0.002 CV) or more was judged as a defective, and the number of short circuited products are shown in Table 1.

With respect to the leakage current, the average is a value calculated excluding the defectives. The results in the reflow test and the moisture resistance test subsequent thereto are shown in Table 2. In the moisture resistance test, a leakage current of 3.2 $\mu$A (0.04 CV) or more was judged as a defective. The reflow test (also referred to as soldering heat resistance test) was performed by the following method. That is, 30 capacitors were provided and the capacitors were traveled through the zone at a temperature of 230° C. over 30 seconds. Thereafter, the leakage current after one minute from applying the rated current was measured and the leakage current of 0.04 CV (3.2 $\mu$A) or more was judged as a defective. In the moisture resistance test, the capacitor was left standing at a high temperature and high humidity of 85° C. and 85% RH for 500 hours.

EXAMPLE 2

30 Capacitors were completed in the same manner as in Example 1 except for using ferric sulfate in place of ammonium persulfate, using dihydroisothianaphthene in place of 3,4-ethylenedioxythiophene and changing the polymerization temperature to 6° C. in Example 1. These capacitor elements were evaluated on the properties in the same manner as in Example 1. The results obtained are shown in Tables 1 and 2.

EXAMPLE 3

30 Capacitors were completed in the same manner as in Example 1 except for using pyrrole in place of 3,4-ethylenedioxythiophene in Example 1. These capacitor elements were evaluated on the properties in the same manner as in Example 1. The results obtained are shown in Tables 1 and 2.

EXAMPLE 4

30 Capacitors were completed in the same manner as in Example 1 except for using aniline in place of 3,4-ethylenedioxythiophene in Example 1. These capacitor elements were evaluated on the properties in the same manner as in Example 1. The results obtained are shown in Tables 1 and 2.

EXAMPLE 5

30 Capacitors were completed in the same manner as in Example 1 except that sodium anthraquinone-2-sulfonate as a compound having a doping action was added to 2 mol/L of an aqueous ammonium persulfate solution to have a concentration of 0.07 mol/L in Example 1. These capacitor elements were evaluated on the properties in the same manner as in Example 1. The results obtained are shown in Tables 1 and 2.

EXAMPLE 6

30 Capacitors were completed in the same manner as in Example 1 except for changing the concentration of the isopropanol solution of 3,4-ethylenedioxythiophene to 5 mol/L in Example 1. These capacitor elements were evaluated on the properties in the same manner as in Example 1. The results obtained are shown in Tables 1 and 2.

EXAMPLE 7

30 Capacitors were completed in the same manner as in Example 1 except for changing the concentration of the isopropanol solution of 3,4-ethylenedioxythiophene to 0.01 mol/L in Example 1. These capacitor elements were evaluated on the properties in the same manner as in Example 1. The results obtained are shown in Tables 1 and 2.

EXAMPLE 8

30 Capacitors were completed in the same manner as in Example 1 except for using 0.07 mol/L of sodium 6-methoxynaphthalenesulfonate in place of 0.07 mol/L of sodium anthraquinone-2-sulfonate in Example 5. These capacitor elements were evaluated on the properties in the same manner as in Example 1. The results obtained are shown in Tables 1 and 2.

EXAMPLE 9

30 Capacitors were completed in the same manner as in Example 1 except for changing the concentration of the aqueous ammonium persulfate solution to 0.01 mol/L in Example 1. These capacitor elements were evaluated on the properties in the same manner as in Example 1. The results obtained are shown in Tables 1 and 2.

EXAMPLE 10

30 Capacitors were completed in the same manner as in Example 1 except for changing the concentration of the aqueous ammonium persulfate solution to 4 mol/L in Example 1. These capacitor elements were evaluated on the properties in the same manner as in Example 1. The results obtained are shown in Tables 1 and 2.

EXAMPLE 11

30 Capacitors were completed in the same manner as in Example 1 except for repeating the operation from the immersing in Solution 1 until the oxidation polymerization was performed two times in Example 1. These capacitor elements were evaluated on the properties in the same manner as in Example 1. The results obtained are shown in Tables 1 and 2.

EXAMPLE 12

30 Capacitors were completed in the same manner as in Example 1 except for using furan in place of 3,4-ethylenedioxythiophene and using 1.4 mol/L of iron (III) paratoluenesulfonate hexahydrate in place of 2 mol/L of ammonium persulfate. These capacitor elements were evaluated on the properties in the same manner as in Example 1. The results obtained are shown in Tables 1 and 2. The electroconductive polymer layer obtained in this Example was observed by scanning electron microscopy under the same conditions as in Example 1. As a result, the morphology similar to that shown in FIG. 1 was observed.

COMPARATIVE EXAMPLE 1

30 Capacitor were completed in the same manner as in Example 1 except that referring to JP-A-10-50558, a polymer was formed by once dipping an aluminum foil in a chemical polymerization solution having dissolved therein 2.87 g (0.02 mol) of 3,4-ethylenedioxythiphene and 29.8 g (0.044 mol) of iron (III) paratoluenesulfonate hexahydrate, heat treating this at 100° C. to form a polymer on the foil, and applying an electroconductive paste (carbon and silver powder) to the portion where the electroconductive polymer layer was formed. These capacitor elements were evaluated on the. properties in the same manner as in Example 1. The results obtained are shown in Tables 1 and 2.

TABLE 1

| | Initial Properties | | | | | |
|---|---|---|---|---|---|---|
| | Capacity ($\mu$F) | Loss Factor (%) | Impedance (m$\Omega$) | Leakage Current ($\mu$A) | Defective Ratio | Number of Short Circuited Capacitors |
| Example 1 | 48.7 | 0.7 | 12 | 0.03 | 0/30 | 0 |
| Example 2 | 47.9 | 0.9 | 14 | 0.05 | 0/30 | 0 |
| Example 3 | 48.6 | 0.8 | 13 | 0.06 | 0/30 | 0 |
| Example 4 | 48.3 | 0.8 | 17 | 0.07 | 0/30 | 0 |
| Example 5 | 48.1 | 0.9 | 13 | 0.09 | 0/30 | 0 |
| Example 6 | 48.8 | 1.0 | 11 | 0.07 | 0/30 | 0 |
| Example 7 | 47.6 | 1.1 | 18 | 0.07 | 0/30 | 0 |
| Example 8 | 48.2 | 0.9 | 16 | 0.08 | 0/30 | 0 |
| Example 9 | 47.9 | 1.2 | 21 | 0.08 | 0/30 | 0 |
| Example 10 | 48.3 | 0.9 | 14 | 0.10 | 0/30 | 0 |
| Example 11 | 47.8 | 1.3 | 24 | 0.13 | 0/30 | 0 |
| Example 12 | 48.2 | 0.9 | 18 | 0.06 | 0/30 | 0 |
| Comparative Example 1 | 47.9 | 2.2 | 80 | 0.17 | 2/30 | 2 |

TABLE 2

| | Reflow Test | | Moisture Resistance Test | | |
|---|---|---|---|---|---|
| | Defective Ratio | Number of Short Circuited Capacitors | Leakage Current ($\mu$A) | Defective Ratio | Number of Short Circuited Capacitors |
| Example 1 | 0/30 | 0 | 0.49 | 0/30 | 0 |
| Example 2 | 0/30 | 0 | 0.54 | 0/30 | 0 |
| Example 3 | 0/30 | 0 | 0.59 | 0/30 | 0 |
| Example 4 | 0/30 | 0 | 0.57 | 0/30 | 0 |
| Example 5 | 0/30 | 0 | 0.61 | 0/30 | 0 |
| Example 6 | 0/30 | 0 | 0.61 | 0/30 | 0 |
| Example 7 | 0/30 | 0 | 0.55 | 0/30 | 0 |
| Example 8 | 0/30 | 0 | 0.56 | 0/30 | 0 |
| Example 9 | 0/30 | 0 | 0.42 | 0/30 | 0 |
| Example 10 | 0/30 | 0 | 0.68 | 0/30 | 0 |
| Example 11 | 0/30 | 0 | 0.69 | 0/30 | 0 |
| Example 12 | 0/30 | 0 | 0.60 | 0/30 | 0 |
| Comparative Example 1 | 3/27 | 3 | 1.68 | 5/27 | 3 |

EXAMPLE 13

6.49 g (0.04 mol) of ferric chloride was put in a 30 ml-volume sample tube and 8 ml of water was charged thereinto to prepare an aqueous ferric chloride solution. Into this solution, 1.68 g (0.02 mol) of thiophene as a polymerizable monomer was calmly poured. The thiophene assumed an upper layer and an interface was generated therebetween. The sample tube was dipped in a warm bath at 40° C. to initiate the polymerization. After 2 hours, the heating was stopped, the sample tube was taken out, and the polymerized product was collected by filtration. To this solid content, 100 ml of water was added, and the resulting solution was stirred for 1 hour and filtered to remove by dissolving excess ferric chloride. Subsequently, 100 ml of acetone was added to the residue, and the mixture was stirred for 1 hour and then filtered to remove unreacted thiophene and soluble low molecular polymer. After this process, a purified polymer was obtained. Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 16 S/cm.

COMPARATIVE EXAMPLE 2

6.49 g (0.04 mol) of ferric chloride was put in a 100 ml-volume round-bottom-flask containing a stirring piece and 16 ml of water was charged thereinto to completely dissolve the ferric chloride. The flask was dipped in a warm bath at 40° C. Then, 1.68 g (0.02 mol) of thiophene as a polymerizable monomer was heated at 30° C., dissolved in 24 ml of isopropanol and introduced into the reaction system, and the stirring was started. During the polymerization reaction, the stirring was continued all the time. After 2 hours, the heating was stopped, the sample tube was taken out, and the polymerized product was collected by filtration. To this solid content, 100 ml of water was added, and the resulting solution was stirred for 1 hour and filtered to remove by dissolving excess ferric chloride. Subsequently, 100 ml of acetone was added to the residue, and the mixture was stirred for 1 hour and then filtered to remove unreacted thiophene and soluble low molecular polymer. After this process, a purified polymer was obtained.

Thereafter, the purified polymer was dried in vacuo at room temperature for a whole day and night and dried. The polymer obtained was fine powder. This polymer was formed in a vacuum while continuously applying a pressure of 10 t for 3 minutes to prepare pellets each having a radius of 1 cm. Using Loresta IP MCP-250 (manufactured by Mitsubishi Petrochemical Co., Ltd.), the surface resistance of the pellet was measured and from the surface resistance obtained, the electroconductivity was calculated and found to be 0.0054 S/cm.

EXAMPLE 14

6.85 g (0.03 mol) of ammonium persulfate was put in a 30 ml-volume sample tube and 8 ml of water was charged thereinto to prepare a solution. Into this solution, 2.87 g (0.02 mol) of 3,4-ethylenedioxythiophene as a polymerizable monomer was calmly poured. An interface was generated between the 3,4-ethylenedioxythiophene and the aqueous solution. The sample tube was dipped in a warm bath at 40° C. to initiate the polymerization. The polymerization proceeding at the interface formed by the aqueous solution containing the oxidizing agent and the 3,4-ethylenedioxythiophene was observed. After 2 hours, the heating was stopped, the sample tube was taken out, and the polymerized product was collected by filtration. To this solid content, 100 ml of water was added, the resulting solution was stirred for 1 hour and filtered to remove by dissolving excess ammonium persulfate. Subsequently, 100 ml of acetone was added to the residue, and the mixture was stirred for 1 hour and then filtered to remove unreacted 3,4-ethylenedioxythiophene and soluble low molecular polymer. After this process, a purified polymer was obtained.

Figure 3:
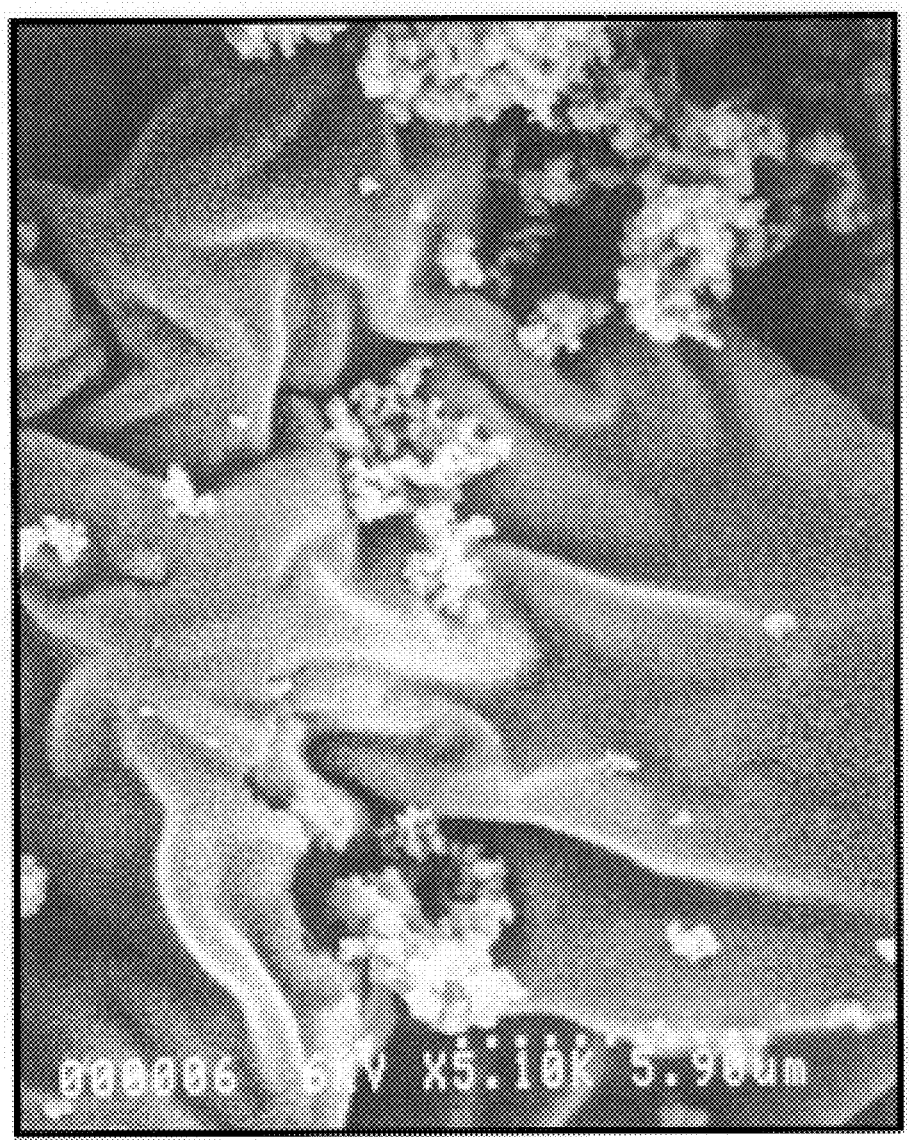
FIG. 3 is a photograph (×5,100) by scanning electron microscopy of the highly electroconductive polymer of 3,4-ethylenedioxythiophene, wherein the polymer was obtained in Example 14.
Figure 3:
Figure 4:
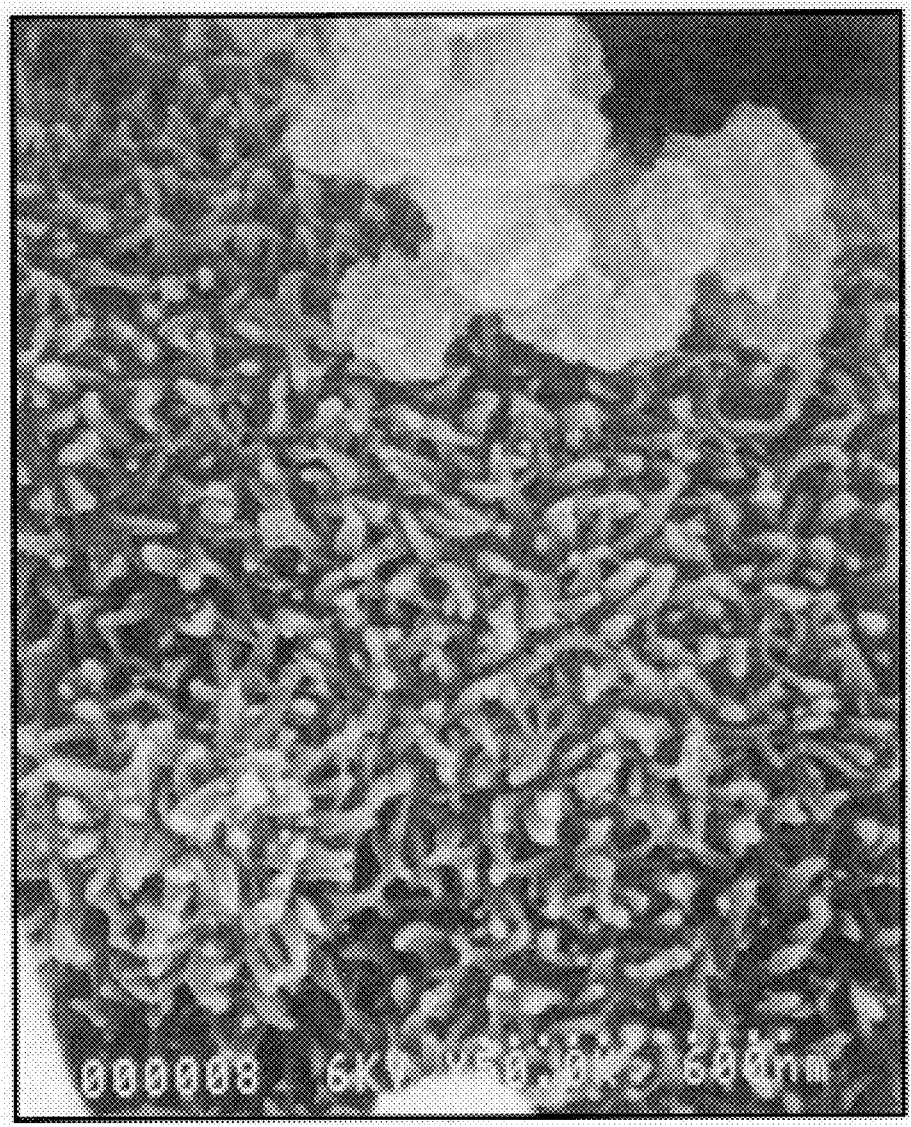
FIG. 4 is an enlarged photograph (×50,000) by scanning electron microscopy of the fibril structure moiety of the highly electroconductive polymer of FIG. 3.

FIG. 3 is an SEM photograph at a 5,100 magnification of the purified polymer. FIG. 4 is an enlarged SEM photograph at a 50,000 magnification of the fibril structure moiety of FIG. 3. In FIG. 4, the fibril structure is clearly seen. The observation of FIG. 4 revealed that the fibril had an outer diameter of approximately 10 to 60 nm.

Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 20 S/cm.

COMPARATIVE EXAMPLE 3

This Example was performed in the same manner as in Comparative Example 2 except for using 2.87 g (0.02 mol) of 3,4-ethylenedioxythiophene as a polymerizable monomer and 6.85 g (0.03 mol) of ammonium persulfate as a polymerization oxidizing agent.

Figure 5:
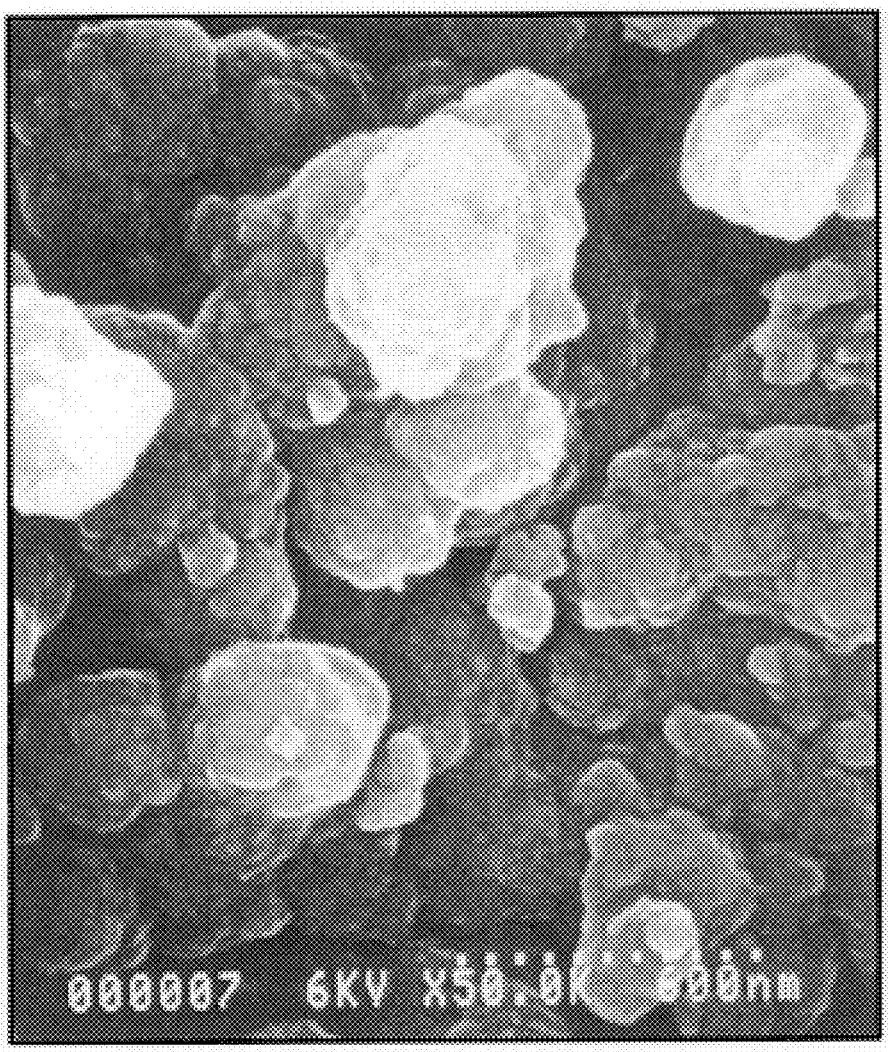
FIG. 5 is a photograph (×50,000) by scanning electron microscopy of the 3,4-ethylenedioxythiophene polymer obtained in Comparative Example 3.

FIG. 5 is an enlarged SEM photograph at a 50,000 magnification of the purified polymer. The fibril structure was not observed.

Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 0.064 S/cm.

EXAMPLE 15

6.85 g (0.03 mol) of ammonium persulfate was put in a 30 ml-volume sample tube and 1 ml of water was charged thereinto to prepare a saturated solution containing undissolved ammonium persulfate. Into this solution, 2.87 g (0.02 mol) of 3,4-ethylenedioxythiophene as a polymerizable monomer was calmly poured. The sample tube was dipped in a warm bath at 40° C. to initiate the polymerization in an open system. After 2 hours, the heating was stopped, the sample tube was taken out, and the polymerized product was collected by filtration. To this solid content, 100 ml of water was added, and the resulting solution was stirred for 1 hour to remove the excess of ammonium persulfate. Then, the solid was filtered. Subsequently, 100 ml of acetone was added to the residue, and the mixture was stirred for 1 hour and then filtered to remove unreacted 3,4-ethylenedioxythiophene and soluble low molecular polymer. After this process, a purified polymer was obtained.

Figure 6:
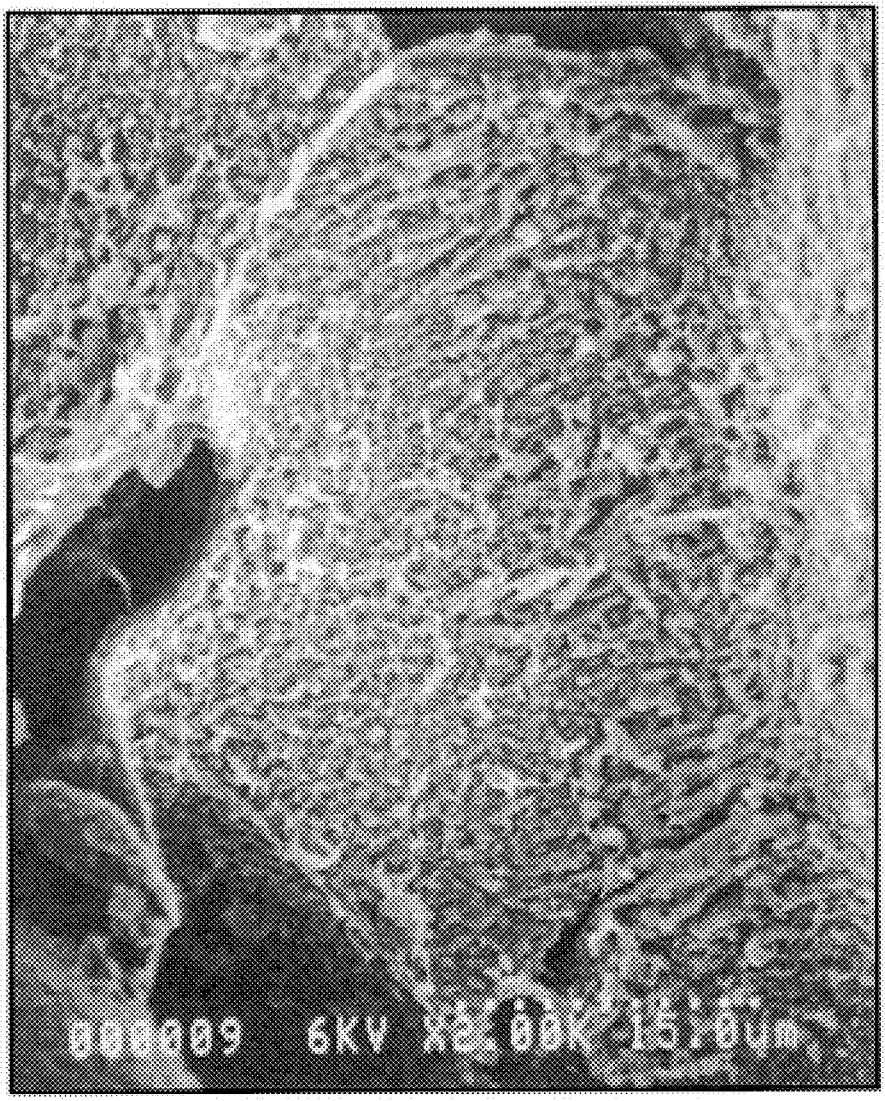
FIG. 6 is a photograph (×2,000) by scanning electron microscopy of the highly electroconductive polymer of 3,4-ethylenedioxythiophene, wherein the polymer was obtained in Example 15.
Figure 6:

FIG. 6 is an enlarged SEM photograph at a 2,000 magnification of the purified polymer. FIG. 7 is an enlarged SEM photograph at a 20,000 magnification of the fibril structure moiety of FIG. 6. The fibril structure is clearly seen.

Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 21 S/cm.

EXAMPLE 16

6.85 g (0.03 mol) of ammonium persulfate was put in a 30 ml-volume sample tube and 8 ml of water was charged thereinto to prepare a solution. Into this solution, 1.86 g (0.014 mol) of 1,3-dihydroisothianaphthene as a polymerizable monomer heated at 30° C. was calmly poured so that an interface could be generated between the monomer and the oxidizing agent solution. The sample tube was dipped in a warm bath at 40° C. to initiate the polymerization. After 6 hours, the heating was stopped, the sample tube was allowed to stand for 7 days to complete the reaction and then taken out, and the polymerized product was collected by filtration. To this solid content, 100 ml of water was added, and the resulting solution was stirred for 1 hour and filtered to remove by dissolving the excess of ammonium persulfate. Subsequently, 100 ml of acetone was added to the residue, and the mixture was stirred for 1 hour and then filtered to remove unreacted 1,3-dihydroisothianaphthene and soluble low molecular polymer. After this process, a purified polymer was obtained.

Figure 8:
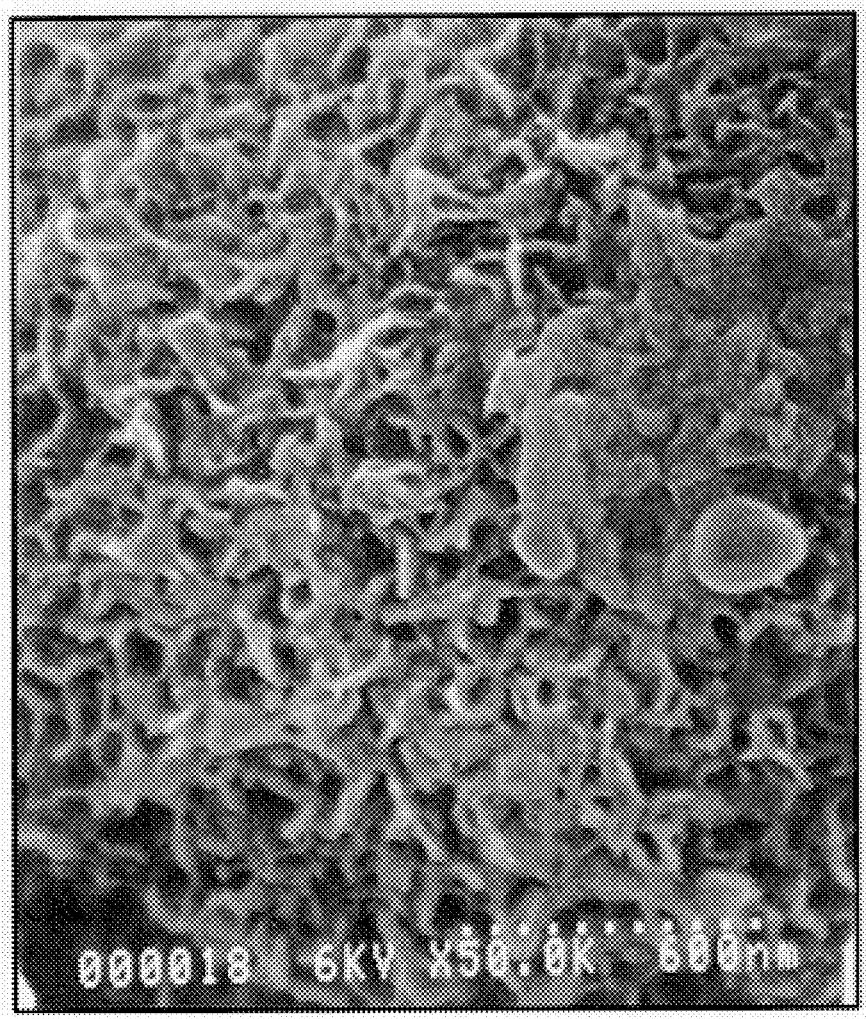
FIG. 8 is a photograph (×50,000) by scanning electron microscopy of the fibril structure moiety for highly electroconductive polymer of 1,3-dihydroisothianaphthene, wherein the polymer was obtained in Example 16.

FIG. 8 is an enlarged SEM (scanning electron microscope) photograph at a 50,000 magnification of the purified polymer. The fibril structure is clearly seen. The observation of FIG. 8 revealed that the fibril had an outer diameter of approximately 10 to 50 nm.

Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 14 S/cm.

COMPARATIVE EXAMPLE 4

This Comparative Example was performed in the same manner as in Comparative Example 2 except for using 1.86 g (0.014 mol) of 1,3-dihydroisothianaphthene as a polymerizable monomer and changing the polymerization time to 2 hours. The polymer obtained was dried and formed in a vacuum while continuously .applying a pressure of 10 t for 3 minutes to prepare pellets each having a radius of 1 cm. Using Loresta IP MCP-250 (manufactured by Mitsubishi Petrochemical Co., Ltd.), the surface resistance of the pellet was measured and from the surface resistance obtained, the electroconductivity was calculated and found to be 0.0033 S/cm.

Figure 9:
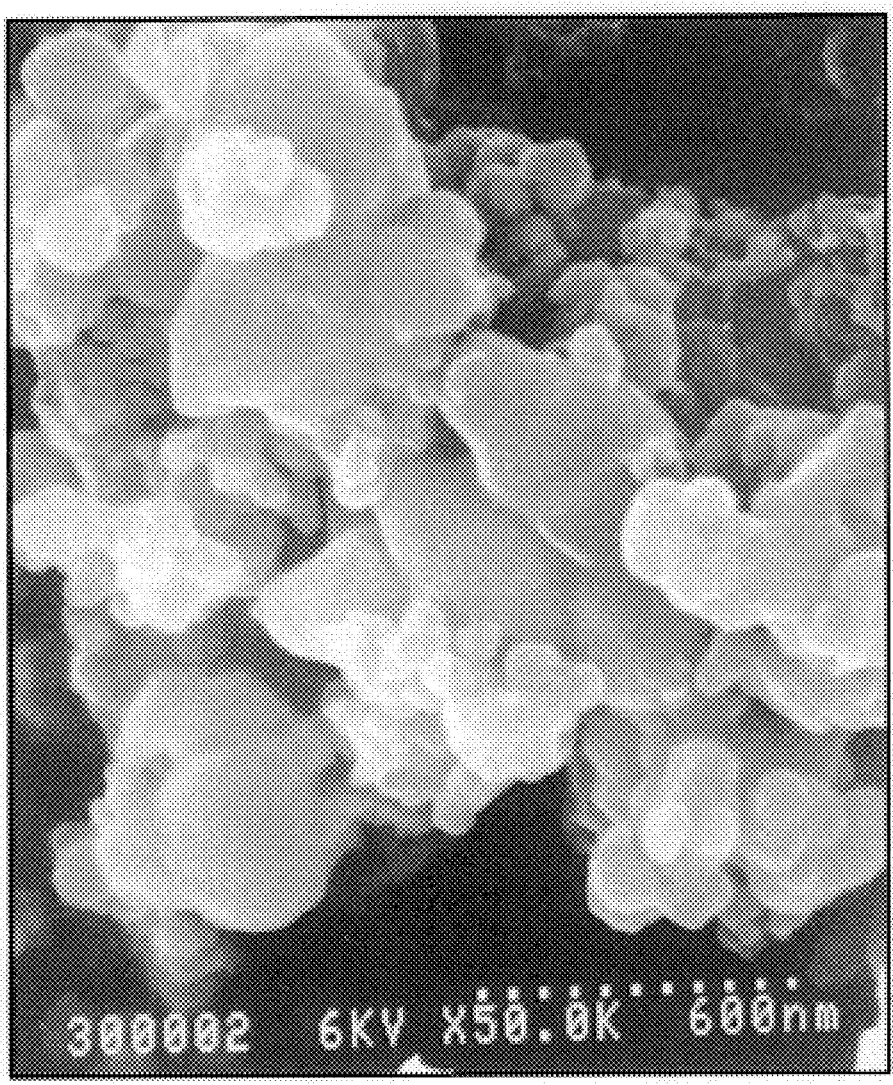
FIG. 9 is a photograph (×50,000) by scanning electron microscopy of the 1,3-dihydroisothianaphthene polymer obtained in Comparative Example 4.

FIG. 9 is an enlarged SEM photograph at a 50,000 magnification of the polymer obtained. The fibril structure was not observed.

EXAMPLE 17

6.85 g (0.03 mol) of ammonium persulfate was put in a 30 ml-volume sample tube and 8 ml of 0.1N-HCl aqueous solution was charged thereinto to prepare a solution. Into this solution, 1.86 g (0.02 mol) of aniline as a polymerizable monomer was calmly poured. The sample tube was dipped in a warm bath at 40° C. to initiate the polymerization. After 2 hours, the heating was stopped, the sample tube then taken out, and the polymerized product was collected by filtration. To this solid content, 100 ml of water was added, and the resulting solution was stirred for 1 hour and filtered to remove by dissolving the excess of ammonium persulfate. Subsequently, 100 ml of acetone was added to the residue, and the mixture was stirred for 1 hour and then filtered to remove unreacted aniline and soluble low molecular polymer. After this process, a purified polymer was obtained.

Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co. A Ltd. the surface resistance of the pellet was measured and from the surface resistance obtained, the electroconductivity was calculated and found to be 10 S/cm.

COMPARATIVE EXAMPLE 5

This Comparative Example was performed in the same manner as in Comparative Example 3 except for using 1.86 g (0.02 mol) of aniline as a polymerizable monomer. The polymer obtained was dried and formed in a vacuum while continuously applying a pressure of 10 t for 3 minutes to prepare pellets each having a radius of 1 cm. Using Loresta IP MCP-250 (manufactured by Mitsubishi Petrochemical Co., Ltd.), the surface resistance of the pellet was measured and from the surface resistance obtained, the electroconductivity was calculated and found to be 0.0024 S/cm.

EXAMPLE 18

6.85 g (0.03 mol) of ammonium persulfate and 0.46 g (0.0014 mol) of sodium anthraquinone-2-sulfonate were put in a 30 ml-volume s ample tube and 8 ml of water was charged thereinto to prepare a solution. Into this solution, 2.87 g (0.02 mol) of 3,4-ethylenedioxythiophene as a polymerizable monomer was calmly poured. The sample tube was dipped in a warm bath at 40° C. to initiate the polymerization. After 2 hours, the heating was stopped, the sample tube then taken out, an d the polymerized product was collected by filtration. To this solid content, 100 ml of water was added, and the resulting solution was stirred for 1 hour and filtered to remove by dissolving the excess of ammonium persulfate and the excess of sodium anthraquinone-2-sulfonate. Subsequently, 100 ml of acetone was added to the residue, and the mixture was stirred for 1 hour and t hen filtered to remove unreacted 3,4-ethylenedioxythiophene and soluble low molecular polymer. After this process, a purified polymer was obtained. Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co. , Ltd.), the surf ace resistance of the pellet was measured and from the surface resistance obtained, the electroconductivity was calculated and found to be 26 S/cm.

EXAMPLE 19

6.85 g (0.03 mol) of ammonium persulfate was put in a 30 m-volume sample tube and 8 ml of water was charged thereinto to prepare a solution. Into this solution, 2.87 g (0.02 mol) of 3,4-ethylenedioxythiophene a s a polymerizable monomer was calmly poured. The sample tube was dipped in a warm bath at 40° C. to initiate the polymerization. After 2 hours, the heating was stopped, the sample tube then taken out, and the polymerized product was collected by filtration. Again, 6.85 g (0.03 mol) of ammonium persulfate was sampled in a 30 ml-volume sample tube and 8 ml of water was charged thereinto to prepare a solution. Into this solution, 2.87 g (0.02 mol) of 3,4-ethylenedioxythiophene as a polymerizable monomer was calmly poured. The polymerized product taken out above was placed in the system, and the sample tube was dipped in a warm bath at 40° C. to initiate the polymerization. This process was repeated 3 times to stack the polymer layers. To the solid content obtained, 100 ml of water was added, and the resulting solution was stirred for 1 hour and filtered to remove by dissolving the excess of ammonium persulfate. Subsequently, 100 ml of acetone was added to the residue, and the mixture was stirred for 1 hour and then filtered to remove unreacted 3,4-ethylenedioxythiophene and soluble low molecular polymer. After this process, a purified polymer was obtained. Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 29 S/cm.

EXAMPLE 20

27.10 g (0.04 mol) of Iron (III) paratoluenesulfonate hexahydrate was put in a 30 ml-volume sample tube and 8 ml of water was charged thereinto to prepare an aqueous oxidizing agent solution. Into this solution, 1.36 g (0.02 mol) of furan as a polymerizable monomer was calmly poured. Furan formed an upper layer of the aqueous solution to generate an interface between furan and the aqueous solution. The sample tube was dipped in a warm bath at 40° C. to initiate the polymerization. After 2 hours, the heating was stopped, the sample tube then taken out, and the polymerized product was collected by filtration. To the solid content obtained, 100 ml of water was added, and the resulting solution was stirred for 1 hour and filtered to remove by dissolving the excess of iron (III) paratoluenesulfonate hexahydrate. Subsequently, 100 ml of acetone was added to the residue, and the mixture was stirred for 1 hour and then filtered to remove unreacted furan and soluble low molecular polymer. After this process, a purified polymer was obtained. Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 13 S/cm.

The electroconductive polymer layer obtained in this Example was observed by scanning electron microscopy under the same conditions as in Example 14. As a result, the morphology similar to that shown in FIGS. 3 and 4 was observed.

EXAMPLE 21

6.49 g (0.04 mol) of ferric chloride was put in a 30 ml-volume sample tube and 8 ml of water was charged thereinto to prepare an aqueous ferric chloride solution. Into this solution, 1.34 g (0.02 mol) of pyrrole as a polymerizable monomer was calmly poured. Pyrrole formed an upper layer of the aqueous solution to generate an interface between pyrrole and the aqueous solution. The sample tube was dipped in a warm bath at 40° C. to initiate the polymerization. After 2 hours, the heating was stopped, the sample tube then taken out, and the polymerized product was collected by filtration. To the solid content obtained, 100 ml of water was added, and the resulting solution was stirred for 1 hour and filtered to remove by dissolving the excess of ferric chloride. Subsequently, 100 ml of acetone was added to the residue, and the mixture was stirred for 1 hour and then filtered to remove unreacted pyrrole and soluble low molecular polymer. After this process, a purified polymer was obtained. Thereafter, the purified polymer was dried in vacuo at room temperature for a whole day and night, then the polymer of pellets each having a radius of 1 cm was prepared in a vacuum while continuously applying a pressure of 10 t for 3 minutes. Using Loresta IP MCP-250 (manufactured by Mitsubishi Petrochemical Co., Ltd.), the surface resistance of the pellet was measured and from the surface resistance obtained, the electroconductivity was calculated and found to be 21 S/cm.

The electroconductive polymer layer obtained in this Example was observed by scanning electron microscopy under the same conditions as in Example 14. As a result, the morphology similar to that shown in FIGS. 3 and 4 was observed.

Industrial Applicability

According to the present invention, highly electroconductive film-like polymer composition containing a repeating unit represented by the general formula (1) to (5) and having a fibril structure, excellent anisotropy and superior film property can be obtained by a simple chemical oxidation polymerization method where a polymerizable monomer represented by the general formula (6) to (10) alone or together with an electrolyte having a doping action is contacted with a solution containing an oxidizing agent having a polymerization initiating ability and is polymerized at the interface formed. Such a highly electroconductive polymer composition is industrially useful for various applications as a highly electroconductive solid electrolyte for use in a solid electrolytic capacitor, as an electroconductive material for use in an antistatic material, an electric wave absorbing material, etc.

According to the present invention, in a solid electrolytic capacitor using an electroconductive polymer as a solid electrolyte, the solid electrolyte formed on a dielectric film layer is the above polymer comprising a repeating unit represented by the general formula (1), (2), (3), (4) or (5) and having a fibril structure, excellent anisotropy and superior film property and therefore, a solid electrolytic layer having an ability of mitigating the thermal stress and an excellent adhesion to the paste layer can be obtained.

Furthermore, according to the present invention, the anode is covered by the above-described solid electrolyte in the film form having a high electroconductivity such that void spaces remain in the anode pores and therefore, the solid electrolytic layer obtained can have also excellent film recoverability at the time of passing electricity.

By virtue of these effects, a solid electrolytic capacitor having not only initial properties (e.g., loss factor, leakage current, heat resistance, equivalent series resistance and impedance in the high frequency region) but also excellent long-term reliability (e.g., durability at high temperature and high humidity) can be provided.

What is claimed is:

1. A highly electroconductive polymer having a macroscopically scaly and fibrillar structure, an electroconductivity of from about 0.1 to about 200 S/cm, an outer diameter in the range of about 3 nm to about 100 nm and comprising as a repeating unit a structure having a thiophene-diyl skeleton represented by the following general formula (1):

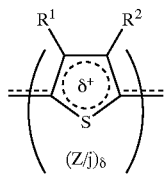

(1)

(wherein the substituents $R^1$ and $R^2$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group or $R^1$ and $R^2$ may combine with each other at any position to form a divalent chain for forming a 3-, 4-, 5-, 6- or 7- membered saturated or unsaturated hydrocarbon cyclic structure together with the carbon atoms substituted by $R^1$ and $R^2$, wherein the cyclic structure may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

2. A method for producing the highly electroconductive polymer of claim 1, comprising contacting at least one polymerizable monomer represented by the following general formula (6):

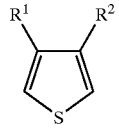

(6)

(wherein $R^1$ and $R^2$ have the same meanings as in formula (1)) with a solution containing an oxidizing agent having a polymerization initiating ability such that an interface is formed therebetween, and performing polymerization at said interface.

3. The method for producing a highly electroconductive polymer having a fibril structure as claimed in claim 2, comprising contacting a solution obtained by dissolving at least one polymerizable monomer represented by formula (6) in a solvent with a solution containing an oxidizing agent having a polymerization initiating ability such that an interface is formed therebetween, and performing polymerization at said interface.

4. The method for producing a highly electroconductive polymer having a fibril structure as claimed in claim 3, wherein the solvent is a hydrophilic organic solvent capable of dissolving the polymerizable monomer.

5. The method for producing a highly electroconductive polymer having a fibril structure as claimed in claim 3, wherein the polymerizable monomer is contacted with the solution containing an oxidizing agent to produce a highly electroconductive polymer having a fibril structure and after washing or not washing the polymer, the method for producing a highly electroconductive polymer having a fibril structure described in claim 3 is performed two or more times on the surface of the highly electroconductive polymer having a fibril structure to stack polymer composition layers.

6. The method for producing a highly electroconductive polymer having a fibril structure as claimed in claim 2, wherein the solution containing an oxidizing agent having a polymerization initiating ability contains an electrolyte having a doping action.

7. The method for producing a highly electroconductive polymer having a fibril structure as claimed in claim 2, wherein the solution containing an oxidizing agent having a polymerization initiating ability is a saturated or supersaturated solution.

8. The method for producing a highly electroconductive polymer having a fibril structure as claimed in claim 2, wherein a saturated solution of an oxidizing agent having a polymerization initiating ability is produced, said oxidizing agent solution is contacted with the polymerizable monomer at a temperature lower than the temperature at the production of said saturated solution to form a interface, and then polymerization is performed.

9. The method for producing a highly electroconductive polymer having a fibril structure as claimed in claim 2, wherein the oxidizing agent having a polymerization initiating agent is at least one of a persulfate, a bichromate and a trivalent iron salt.

10. The method for producing a highly electroconductive polymer having a fibril structure as claimed in claim 2, wherein the polymerizable monomer is contacted with the solution containing an oxidizing agent to produce a highly electroconductive polymer having a fibril structure and after washing or not washing the polymer, the method for producing a highly electroconductive polymer having a fibril structure described in claim 2 is performed two or more times on the surface of the highly electroconductive polymer having a fibril structure to stack polymer composition layers.

11. A highly electroconductive polymer having a macroscopically scaly and fibrillar structure, an electroconductivity of from about 0.1 to about 200 S/cm, an outer diameter in the range of about 3 nm to about 100 nm and comprising as a repeating unit a structure having a condensed polycyclic skeleton represented by the following general formula (2):

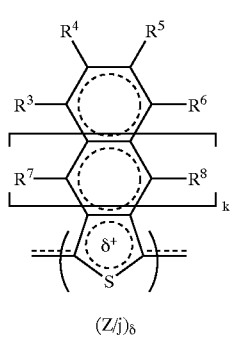

(2)

(wherein the substituents of $R^3$, $R^4$, $R^5$, $R^6$, $R^7$ and $R^8$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group or $R^3$, $R^4$, $R^5$, $R^6$, $R^7$ or $R^8$ may combine with each other at any position to form a divalent chain for forming at least one 3-, 4-, 5-, 6- or 7- membered saturated or unsaturated hydrocarbon cyclic structure together with the carbon atoms substituted by $R^3$, $R^4$, $R^5$, $R^6$, $R^7$ or $R^8$, wherein the cyclic structure may optionally contain a bond such as carbonyl, ether, ester, amide, sulfide, sulfinyl, sulfonyl and imino at any position, k represents the number of condensed rings surrounded by the thiophene ring and the benzene ring having the substituents $R^3$ to $R^6$ and is 0 or an integer of from 1 to 3, the condensed ring in the formula may optionally contain nitrogen or N-oxide, m with the proviso that the substituents $R^3$ to $R^8$ are deducted by the number of nitrogen or N-oxide, δ represents a number in the range of from 0 to 1, Z represents an anion, and j represents a valence of Z and is 1 or 2).

12. A method for producing the highly electroconductive polymer of claim 11, comprising contacting at least one polymerizable monomer represented by the following general formula (7):

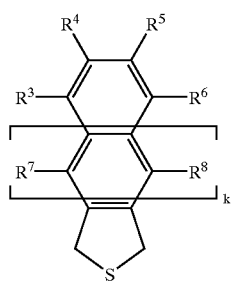

(7)

(wherein $R^3$, $R^4$, $R^5$, $R^6$, $R^7$, $R^8$ and k have the same meanings as in formula (2)) with a solution containing an oxidizing agent having a polymerization initiating ability such that an interface is formed therebetween, and performing polymerization at said interface.

13. A highly electroconductive polymer having a macroscopically scaly and fibrillar structure, an electroconductivity of from about 0.1 to about 200 S/cm, an outer diameter in the range of about 3 nm to about 100 nm and comprising as a repeating unit a structure having a pyrrole-diyl skeleton represented by the following general formula (3).

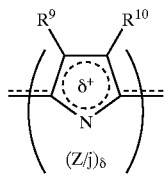

(3)

(wherein $R^9$ and $R^{10}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, or $R^9$ and $R^{10}$ may combine with each other at any position to form a divalent chain for forming at least one 3-, 4-, 5-, 6- or 7-membered saturated or unsaturated hydrocarbon cyclic structure together with the carbon atoms substituted by $R^9$ and $R^{10}$, and the cyclic structure may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

14. A method for producing the highly electroconductive polymer of claim 13, comprising contacting at least one polymerizable monomer represented by the following general formula (8):

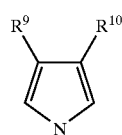

(8)

(wherein $R^9$ and $R^{10}$ have the same meanings as in formula (3)) with a solution containing an oxidizing agent having a polymerization initiating ability such that an interface is formed therebetween, and performing polymerization at said interface.

15. A highly electroconductive polymer having a macroscopically scaly and fibrillar structure, an electroconductivity of from about 0.1 to about 200 S/cm, an outer diameter in the range of about 3 nm to about 100 nm and comprising as a repeating unit a structure having a furan-diyl skeleton represented by the following general formula (4):

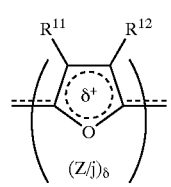

(4)

(wherein the substituents $R^{11}$ and $R^{12}$ each independently represent a monovalent group selected from the group consisting of a hydrogen atom, a linear or branched, saturated or unsaturated alkyl alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, or $R^{11}$ and $R^{12}$ may combine with each other at any position to form a divalent chain for forming at least one 3-, 4-, 5-, 6- or 7-membered saturated or unsaturated hydrocarbon cyclic structure together with the carbon atoms substituted by $R^{11}$ and $R^{12}$, the cyclic structure may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

16. A method for producing the highly electroconductive polymer of claim 15, comprising contacting at least one polymerizable monomer represented by the following general formula (9):

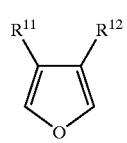

(9)

(wherein $R^{11}$ and $R^{12}$ have the same meanings as in formula (4)) with a solution containing an oxidizing agent having a polymerization initiating ability such that an interface is formed therebetween, and performing polymerization at said interface.

17. A highly electroconductive polymer having a macroscopically scaly and fibrillar structure, an electroconductivity of from about 0.1 to about 200 S/cm, an outer diameter in the range of about 3 nm to about 100 nm and comprising as a repeating unit a structure having an iminophenylene skeleton represented by the following general formula (5):

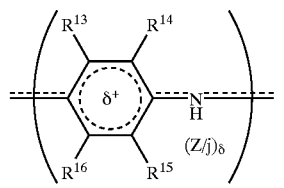
(5)

(wherein the substituents $R^{13}$, $R^{14}$, $R^{15}$ and $R^{16}$ each independently represent a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, or $R^{13}$, $R^{14}$, $R^{15}$ and $R^{16}$ may combine with each other at any position to form a divalent chain for forming at least one 3-, 4-, 5-, 6- or 7-membered saturated or unsaturated hydrocarbon cyclic structure together with the carbon atoms substituted by $R^{13}$, $R^{14}$, $R^{15}$ and $R^{16}$, the cyclic structure may optionally contain a bond such as carbonyl, ether, ester, amide, sulfide, sulfinyl, sulfonyl and imino at any position, δ represents a number in the range of from 0 to 1, Z represents an anion, and j represents a valence of Z and is 1 or 2).

18. A method for producing the highly electroconductive polymer of claim 17, comprising contacting at least one polymerizable monomer represented by the following general formula (10):

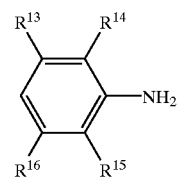
(10)

(wherein $R^{13}$, $R^{14}$, $R^{15}$ and $R^{16}$ have the same meanings as in formula (5)) with a solution containing an oxidizing agent having a polymerization initiating ability such that an interface is formed therebetween, and performing polymerization at said interface.

* * * * *